US012587443B2

(12) United States Patent
Panchal et al.

(10) Patent No.: US 12,587,443 B2
(45) Date of Patent: Mar. 24, 2026

(54) CREATION AND DEPLOYMENT OF SERVICES

(71) Applicant: AT&T Intellectual Property I, L.P., Atlanta, GA (US)

(72) Inventors: Deven Panchal, Middletown, NJ (US); Prafulla Verma, Holmdel, NJ (US); Vijay Venkatesh Kumar, Green Brook, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/770,063

(22) Filed: Jul. 11, 2024

(65) Prior Publication Data

US 2026/0019327 A1     Jan. 15, 2026

(51) Int. Cl.
    *H04L 43/08*     (2022.01)
    *H04L 41/0654*     (2022.01)
    *H04L 41/0806*     (2022.01)

(52) U.S. Cl.
    CPC ...... *H04L 41/0806* (2013.01); *H04L 41/0654* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 9,760,923 B1 * | 9/2017 | Felstaine | ........... G06Q 30/0603 |
| 11,818,004 B1 * | 11/2023 | Bannihatti Kumar | ...................... H04L 41/0866 |
| 2025/0265071 A1 * | 8/2025 | Anantheswaran | ........ G06F 8/65 |

* cited by examiner

*Primary Examiner* — Natisha D Cox
(74) *Attorney, Agent, or Firm* — Hartman & Citrin LLC

(57) ABSTRACT

Creation and deployment of services can include receiving a service request that identifies intended functionality of the service; accessing a service catalog that defines service components including microservices and metadata that defines purposes of the service components; recommending, based on the intended functionality and the metadata, a service design for the service including a first service component and a second service component; configuring the service components to define outputs and inputs for the first service component and the second service component; identifying, for the service components, infrastructure that is to support the service components and a geographic location of the infrastructure; configuring, for the service components, security policies including one of a firewall, a filter list, or an authentication requirement; preparing the service components for deployment to the infrastructure; and triggering deployment of the service components to the infrastructure to deploy the service.

20 Claims, 33 Drawing Sheets

500A

500B

500C

500D

500E

500G

500K

500M

135.207.216.172 says

Success, Your Flows Have Been Distributed
Successfully.

OK

5000

500Q

500T

CREATION AND DEPLOYMENT OF SERVICES

BACKGROUND

Network services may be of many different types, may be hosted on varied and diverse computing resources and/or in varied and diverse cloud environments, and the like. Aside from services and products (wireless, fiber, wireline, and others) that are provided to customers, there may also be internal services to perform various operations associated with network, service, and/or application management. Given the varied and diverse technologies and environments used to provide these and other services, management of services can be complicated and require access to various tools and networks.

SUMMARY

The present disclosure is directed to creation and deployment of services, for example, using a service creation and deployment orchestrator. According to various embodiments of the service creation and deployment orchestrator illustrated and described herein, artificial intelligence, machine learning, generative artificial intelligence, and the like can be leveraged to create an augmented service design, creation, orchestration, and deployment platform that can be used to create, design, orchestrate, and deploy services in advanced networks such as sixth generation ("6G") mobility networks and future and evolved networks as well. Thus, embodiments of the concepts and technologies disclosed herein can enable service design that leverages various features such as, for example, network slicing, dynamic spectrum allocation, predictive maintenance, energy efficiency, channel estimation, dynamic security policies and implementation, intelligent spectrum allocation, service assurance, and the like.

A service creation and deployment orchestrator can be configured to receive a service request from another device such as a user device or as created via interactions with the service creation and deployment orchestrator. The service creation and deployment orchestrator can be configured to analyze the service request and determine, based on the analysis of the service request, components, functions, and/or functionality being requested by way of the service request. The service creation and deployment orchestrator can identify one or more components of the service being requested by way of the service request. The service creation and deployment orchestrator can access or query a service catalog based on the identified functions.

Once the identified service components that can cooperatively provide the requested service are identified by the service creation and deployment orchestrator, the service creation and deployment orchestrator can configure the service components. Namely, the service creation and deployment orchestrator can be configured to customize inputs, outputs, network resources, and the like based on the function of the service and/or other considerations. For each service component, the service creation and deployment orchestrator can identify infrastructure and infrastructure location(s) that will host and/or provide the service component. The service creation and deployment orchestrator also can configure one or more security policies for the service component.

The service creation and deployment orchestrator can prepare the service component for deployment such as preparing an image, software code or executable instructions, objects, commands, packages, or the like that can be sent to one or more controllers, orchestrators, or other entities associated with the computing environments for instantiation. The service creation and deployment orchestrator can repeat the operations for configuring the service component, identifying infrastructure and infrastructure location, configuring security policies, and preparing for deployment for each service component included in the service. Once the service creation and deployment orchestrator determines that all service components have been prepared for deployment, the service creation and deployment orchestrator can trigger deployment of the service components.

The service creation and deployment orchestrator also can be configured to monitor security issues and/or performance metrics associated with the service. The service creation and deployment orchestrator can initiate monitoring of the service (e.g., by invoking the security and compliance module and/or the monitoring module, receiving reports from the service, or the like). The service creation and deployment orchestrator can determine if any issues (e.g., faults, errors, security issues, or the like) are detected with respect to the service. If the service creation and deployment orchestrator detects any issues, the service creation and deployment orchestrator can obtain fault resolution policies for the service and/or service components, and remediate the detected issues. In some embodiments, the service creation and deployment orchestrator can modify the service components, the infrastructure, and/or other aspects of the service components to remediate the faults.

The service creation and deployment orchestrator also can be configured to monitor performance of the service and to update the service and/or service components if appropriate. The service creation and deployment orchestrator can initiate monitoring of the service and obtain performance metrics and/or policies for the service. The service creation and deployment orchestrator can review the performance metrics (e.g., key performance indicators, utilization, or the like) and one or more performance policies for the service to determine if any updates should be made to the service and/or the service components. If the service creation and deployment orchestrator determines that any updates should be made to the service and/or service components, the service creation and deployment orchestrator can update the service components. Thus, the service can be updated to address performance issues by the service creation and deployment orchestrator at substantially any time.

Embodiments of the concepts and technologies disclosed herein can provide a service creation and deployment tool that can include a data collection analytics and events microservice onboarding and design module and a service creation and deployment orchestrator. The service creation and deployment tool can be used to architect, design, and implement an improved end-to-end framework and a platform containing the toolset to streamline the creation and operationalization of artificial intelligence, machine learning, and/or generative artificial intelligence (e.g., via one or more large language models) to enable network, telecommunications, and/or security services easily and quickly.

Embodiments of the service creation and deployment tool can provide efficient creation of services (e.g., including powerful services using artificial intelligence, machine learning, and/or generative artificial intelligence for network, telecommunications, and/or security services). In some embodiments, a drag and drop and connect interface can be provided by a user interface of the data collection analytics and events microservice onboarding and design module. The creation of services and/or a design time can be powered by large language models to aid in quick familiarization with the platform and help discover microservices during design time. In some embodiments of the concepts and technologies disclosed herein, the service creation and deployment tool can be deployed to monitor network, telecommunications, and/or security services in any operational support system ("OSS") or other network management platform or network OS (or even ONAP or another orchestration platform).

According to various embodiments of the concepts and technologies disclosed herein, the service creation and deployment tool can be used to create a flow (e.g., a service design) for a service. Namely, given a design intent for a service (e.g., a purpose or functionality desired for the service), the service creation and deployment tool can access a service catalog, review all of the microservices available, and suggest and/or create a flow (or service design) that could fulfill the desired design intent (e.g., the purpose or functionality for the service). In the event that the design flow or service design cannot be fulfilled or supported by the available microservices, the service creation and deployment tool can be configured to advise the user or other entity that such a service is not currently available. It can be appreciated that the confidence above which the service creation and deployment tool can provide a flow or service design may be a tunable parameter (e.g., a confidence in excess of fifty percent, sixty percent, or the like) for various large language models and/or can be configured to provide a flow or service design only with a particular confidence. It should be understood that this example embodiment is illustrative, and therefore should not be construed as being limiting in any way.

Embodiments of the concepts and technologies disclosed herein can be integrated into and operate and/or federate with other model marketplaces and can enable reuse of AI/ML models from a variety of model hubs and/or large language model hubs using adapters. Embodiments can also enable sharing and reuse of components and microservices built at other instances of the service creation and deployment tool (e.g., belonging to other owners) using a federator. Such an approach can enable reuse of AI/ML models built by teams, organizations, companies, and other entities across the world to be reused as-is, or used by retraining on new data in many different network services by different teams, organizations, companies and organizations. Acumos adapter interfaces with the federation interface of Acumos can allow AI/ML model sharing to also be monetized in a vendor-client set-up, if desired or required. Such features can simplify collaboration on creation of AI/ML models and/or creation of network services.

Wherever applicable, newer and better versions of the same AI/LLM/ML model can be fetched and used to compose network services in the data collection analytics and events microservice onboarding and design module. This can allow version control and retrieval of service flows/design and can simplify update or upgrade service designs with newer AI/ML models and deploy them from the data collection analytics and events microservice onboarding and design module itself. Embodiments of the service creation and deployment tool also can provide the ability to deploy and orchestrate services to various hybrid-cloud and/or multi-cloud environments using a multi-cloud and/or hybrid-cloud orchestrator. Thus, embodiments of the concepts and technologies disclosed herein can enable creation of AI/ML/LLM models and embedding of those models into network, telecommunications, and/or security services that can be deployed directly inside an OSS or a network operating system and/or an end-to-end network management platform like ONAP, which can manage and orchestrate most of the service provider's network. This reduction in time and effort can make it possible for different types of AI/ML enabled network, telecom, and security services or augmenting existing services. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving a service request including a request for a service; accessing a service catalog that defines service components including microservices, the service catalog including metadata that defines purposes of the service components; identifying, based on the service request and the metadata, a flow for the service, the flow including a first service component and a second service component; configuring, for each of the first service component and the second service component, wherein configuring can include defining outputs and inputs for the first service component and the second service component; identifying, for each of the first service component and the second service component, infrastructure that is to support the first service component and the second service component and a geographic location of the infrastructure; configuring, for each of the first service component and the second service component, security policies including one of a firewall, a filter list, or an authentication requirement; preparing the first service component and the second service component for deployment to the infrastructure; and triggering deployment of the first service component and the second service component to the infrastructure to deploy the service. The first service component can be deployed to a first computing environment and the second service component can be deployed to a second computing environment.

In some embodiments, the operations can further include monitoring the service; determining, based on monitoring the service, if any faults are detected in the service; and in response to determining that a fault is detected in the service, accessing a fault resolution policy from the service catalog and remediating the fault. In some embodiments, monitoring the service can include receiving a report from the first computing environment or the second computing environment, and wherein the report can describe operation of the service. In some embodiments, the operations can further include monitoring the service; determining, based on a performance metric and a policy, if an update to the service is to be made; and in response to determining that an update to the service is to be made, updating a service component and triggering deployment of an updated service component. In some embodiments, monitoring the service can include receiving a report from the first computing environment or the second computing environment. The report can include the performance metric.

In some embodiments, triggering deployment of the first service component and the second service component to the infrastructure to deploy the service can include deploying the first service component to a first cloud provider and deploying the second service component to a second cloud provider. In some embodiments, the operations can further include receiving, at a data collection analytics and events microservice onboarding and design module, runtime data from the first computing environment and the second computing environment; generating, based on the runtime data, catalog data including component data, metadata, and policies associated with the first computing environment and the second computing environment; and storing the catalog data as the service catalog.

According to another aspect of the concepts and technologies disclosed herein, a method is disclosed. The method can include receiving, at a computer including a processor, a service request including a request for a service; accessing, by the processor, a service catalog that defines service components including microservices, the service catalog including metadata that defines purposes of the service components; identifying, by the processor and based on the service request and the metadata, a flow for the service, the flow including a first service component and a second service component; configuring, by the processor and for each of the first service component and the second service component, wherein configuring can include defining outputs and inputs for the first service component and the second service component; identifying, by the processor and for each of the first service component and the second service component, infrastructure that is to support the first service component and the second service component and a geographic location of the infrastructure; configuring, by the processor and for each of the first service component and the second service component, security policies including one of a firewall, a filter list, or an authentication requirement; preparing, by the processor, the first service component and the second service component for deployment to the infrastructure; and triggering, by the processor, deployment of the first service component and the second service component to the infrastructure to deploy the service. The first service component can be deployed to a first computing environment and the second service component can be deployed to a second computing environment.

In some embodiments, the method can further include monitoring the service; determining, based on monitoring the service, if any faults are detected in the service; and in response to determining that a fault is detected in the service, accessing a fault resolution policy from the service catalog and remediating the fault. In some embodiments, monitoring the service can include receiving a report from the first computing environment or the second computing environment. The report can describe operation of the service.

In some embodiments, the method also can include monitoring the service; determining, based on a performance metric and a policy, if an update to the service is to be made; and in response to determining that an update to the service is to be made, updating a service component and triggering deployment of an updated service component. In some embodiments, monitoring the service can include receiving a report from the first computing environment or the second computing environment. The report can include the performance metric. In some embodiments, the method can also include receiving, at a data collection analytics and events microservice onboarding and design module, runtime data from the first computing environment and the second computing environment; generating, based on the runtime data, catalog data including component data, metadata, and policies associated with the first computing environment and the second computing environment; and storing the catalog data as the service catalog.

According to yet another aspect of the concepts and technologies disclosed herein, a computer storage medium is disclosed. The computer storage medium can store computer-executable instructions that, when executed by a processor, cause the processor to perform operations. The operations can include receiving a service request including a request for a service; accessing a service catalog that defines service components including microservices, the service catalog including metadata that defines purposes of the service components; identifying, based on the service request and the metadata, a flow for the service, the flow including a first service component and a second service component; configuring, for each of the first service component and the second service component, wherein configuring can include defining outputs and inputs for the first service component and the second service component; identifying, for each of the first service component and the second service component, infrastructure that is to support the first service component and the second service component and a geographic location of the infrastructure; configuring, for each of the first service component and the second service component, security policies including one of a firewall, a filter list, or an authentication requirement; preparing the first service component and the second service component for deployment to the infrastructure; and triggering deployment of the first service component and the second service component to the infrastructure to deploy the service. The first service component can be deployed to a first computing environment and the second service component can be deployed to a second computing environment.

In some embodiments, the operations can further include monitoring the service; determining, based on monitoring the service, if any faults are detected in the service; and in response to determining that a fault is detected in the service, accessing a fault resolution policy from the service catalog and remediating the fault. In some embodiments, monitoring the service can include receiving a report from the first computing environment or the second computing environment, and wherein the report can describe operation of the service. In some embodiments, the operations can further include monitoring the service; determining, based on a performance metric and a policy, if an update to the service is to be made; and in response to determining that an update to the service is to be made, updating a service component and triggering deployment of an updated service component. In some embodiments, monitoring the service can include receiving a report from the first computing environment or the second computing environment. The report can include the performance metric.

In some embodiments, triggering deployment of the first service component and the second service component to the infrastructure to deploy the service can include deploying the first service component to a first cloud provider and deploying the second service component to a second cloud provider. In some embodiments, the operations can further include receiving, at a data collection analytics and events microservice onboarding and design module, runtime data from the first computing environment and the second computing environment; generating, based on the runtime data, catalog data including component data, metadata, and policies associated with the first computing environment and the second computing environment; and storing the catalog data as the service catalog.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
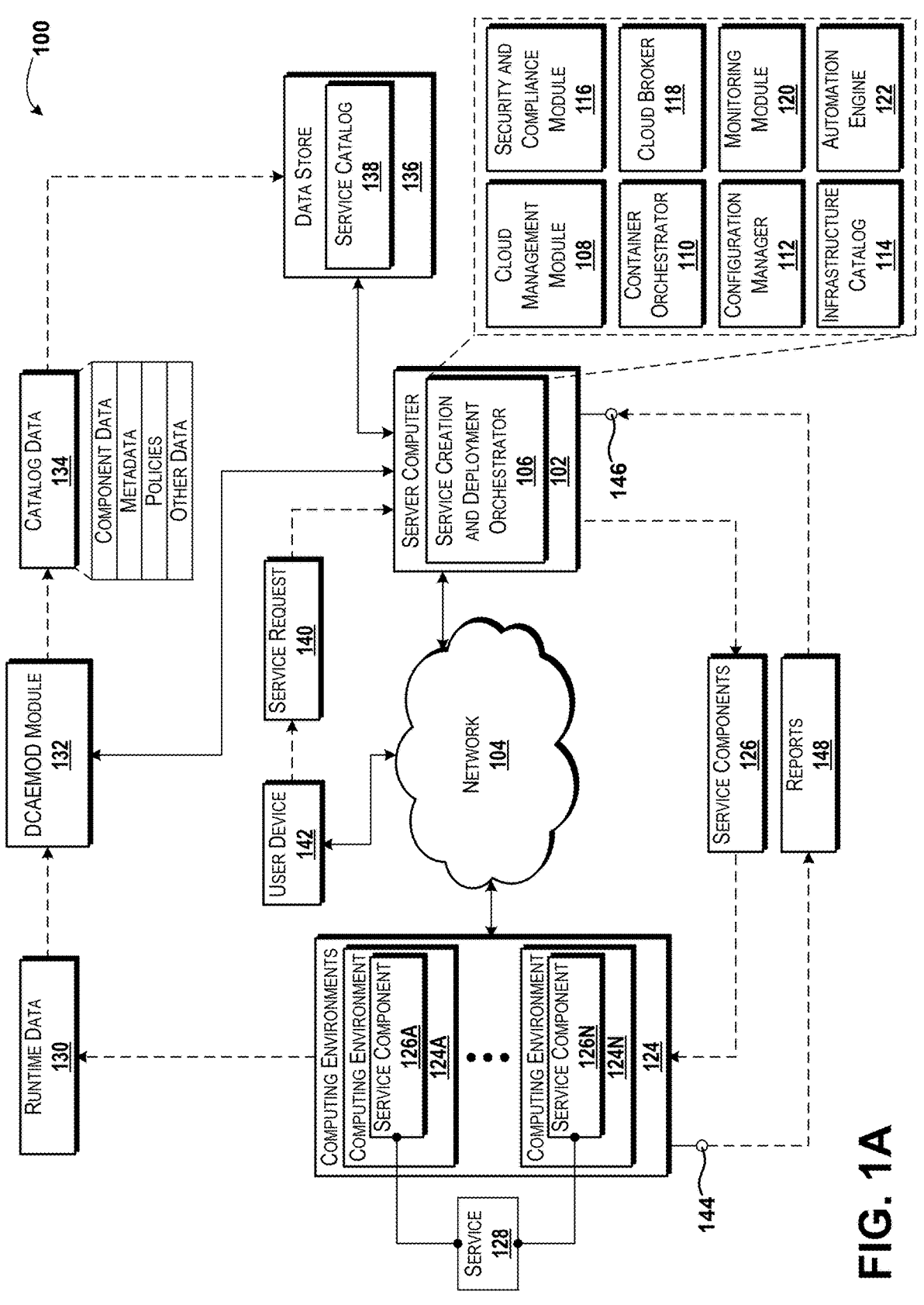
FIG. 1A is a system diagram illustrating an illustrative operating environment for various embodiments of the concepts and technologies described herein.

The following detailed description is directed to creation and deployment of services, for example using a service creation and deployment orchestrator. A service creation and deployment orchestrator can be configured to receive a service request from another device such as a user device or as created via interactions with the service creation and deployment orchestrator. The service creation and deployment orchestrator can be configured to analyze the service request and determine, based on the analysis of the service request, components, functions, and/or functionality being requested by way of the service requests. The service creation and deployment orchestrator can identify one or more components of the service being requested by way of the service request. The service creation and deployment orchestrator can access or query a service catalog based on the identified functions.

Once the identified service components that can cooperatively provide the requested service are identified by the service creation and deployment orchestrator, the service creation and deployment orchestrator can configure the service components. Namely, the service creation and deployment orchestrator can be configured to customize inputs, outputs, network resources, and the like based on the function of the service and/or other considerations. For each service component, the service creation and deployment orchestrator can identify infrastructure and infrastructure location(s) that will host and/or provide the service component. The service creation and deployment orchestrator also can configure one or more security policies for the service component.

The service creation and deployment orchestrator can prepare the service component for deployment such as preparing an image, software code or executable instructions, objects, commands, packages, or the like that can be sent to one or more controllers, orchestrators, or other entities associated with the computing environments for instantiation. The service creation and deployment orchestrator can repeat the operations for configuring the service component, identifying infrastructure and infrastructure location, configuring security policies, and preparing for deployment for each service component included in the service. Once the service creation and deployment orchestrator determines that all service components have been prepared for deployment, the service creation and deployment orchestrator can trigger deployment of the service components.

The service creation and deployment orchestrator also can be configured to monitor security issues and/or performance metrics associated with the service. The service creation and deployment orchestrator can initiate monitoring of the service (e.g., by invoking the security and compliance module and/or the monitoring module, receiving reports from the service, or the like). The service creation and deployment orchestrator can determine if any issues (e.g., faults, errors, security issues, or the like) are detected with respect to the service. If the service creation and deployment orchestrator detects any issues, the service creation and deployment orchestrator can obtain fault resolution policies for the service and/or service components, and remediate the detected issues. In some embodiments, the service creation and deployment orchestrator can modify the service components, the infrastructure, and/or other aspects of the service components to remediate the faults.

The service creation and deployment orchestrator also can be configured to monitor performance of the service and to update the service and/or service components if appropriate. The service creation and deployment orchestrator can initiate monitoring of the service and obtain performance metrics and/or policies for the service. The service creation and deployment orchestrator can review the performance metrics (e.g., key performance indicators, utilization, or the like) and one or more performance policies for the service to determine if any updates should be made to the service and/or the service components. If the service creation and deployment orchestrator determines that any updates should be made to the service and/or service components, the service creation and deployment orchestrator can update the service components. Thus, the service can be updated to address performance issues by the service creation and deployment orchestrator at substantially any time.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 for various embodiments of the concepts and technologies disclosed herein for creation and deployment service will be described, according to an illustrative embodiment. The operating environment 100 shown in FIG. 1A includes a server computer 102. The server computer 102 can operate in communication with and/or as part of a communications network ("network") 104, though this is not necessarily the case in all embodiments.

According to various embodiments, the functionality of the server computer 102 may be provided by one or more server computers, application servers, web servers, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as an application server. It should be understood that this embodiment is illustrative, and should not be construed as being limiting in any way.

The server computer 102 can execute an operating system (not labeled in FIG. 1A) and one or more application programs such as, for example, a service creation and deployment orchestrator 106. The operating system can include a computer program that can control the operation of the server computer 102. The service creation and deployment orchestrator 106 can include an executable program that can be configured to execute on top of the operating system to provide various functions as illustrated and described herein. As shown in FIG. 1A, the service creation and deployment orchestrator 106 can include various components, modules, or the like. In the illustrated embodiment, the components of the service creation and deployment orchestrator 106 include a cloud management module 108, a container orchestrator 110, a configuration manager 112, an infrastructure catalog 114, a security and compliance module 116, a cloud broker 118, a monitoring module 120, and an automation engine 122. The functionality of the service creation and deployment orchestrator 106 will be explained in more detail after introducing other components of the operating environment 100.

The operating environment 100 also can include one or more cloud platforms, computing environments, data centers, or the like ("computing environments") 124A-N (hereinafter collectively and/or generically referred to as "computing environments 124"). The computing environments 124 can host one or more service components 126A-N that can collectively provide functionality associated with a service 128. It can be appreciated that the computing environments 124 illustrated and described herein can include various platforms, providers, and the like, as explained in more detail below. Thus, it can be appreciated that the service 128 can include one or more service components 126 operating on or in one or more computing environments. It should be understood that this example embodiment is illustrative, and therefore should not be construed as being limiting in any way.

In various embodiments of the concepts and technologies disclosed herein, one or more of the computing environments 124 can include monitoring and/or data collection functionality, which can be configured to generate a stream of runtime data 130. The runtime data 130 can include, for example, data capturing components of service functions, network functions, network topologies, metadata associated with various resources operating in the computing environment 124, security policies and/or fault management procedures, performance metrics and/or performance guidelines, other types of information, combinations thereof, or the like. The runtime data 130 can be output to a data collection analytics and events microservice onboarding and design ("DCAEMOD") module 132 (labeled "DCAEMOD 132" in FIG. 1A) . . . . According to various embodiments of the concepts and technologies disclosed herein, the data collection analytics and events microservice onboarding and design module 132 can be configured to receive the runtime data 130 from the computing environments 124 and/or the service 128, and output catalog data 134 to a data store 136 (or to the server computer 102, which can be configured to store the catalog data 134 and/or portions thereof in the data store 136).

More particularly, the service creation and deployment orchestrator 106 and the data collection analytics and events microservice onboarding and design module 132 can be configured to provide onboarding, design, and distribution of services 128 and/or service components 126. According to various embodiments of the concepts and technologies disclosed herein, the data collection analytics and events microservice onboarding and design module 132 can be provided by a mix of components that can be integrated together (and with the service creation and deployment orchestrator 106) to provide the functionality illustrated and described herein. Because the data collection analytics and events microservice onboarding and design module 132 can be used in various embodiments of the concepts and technologies disclosed herein to build the service catalog 138 used by the service creation and deployment orchestrator 106 illustrated and described herein, the data collection analytics and events microservice onboarding and design module 132 will be described.

In various embodiments of the concepts and technologies disclosed herein, the data collection analytics and events microservice onboarding and design module 132 can include an onboarding application programming interface for onboarding models, service components 126, microservices, and the like. In some embodiments of the concepts and technologies disclosed herein, the onboarding application programming interface can include a hypertext transfer protocol ("HTTP") representational state transfer ("REST") application programming interface for onboarding these components into the data collection analytics and events microservice onboarding and design module 132. Because other application programming interfaces can provide the onboarding application programming interface illustrated and described herein, it should be understood that this example embodiment is illustrative, and therefore should not be construed as being limiting in any way.

The data collection analytics and events microservice onboarding and design module 132 also can include a genprocessor, which can include a JAVA-based component that can provide a tool that generates a software processor (e.g., a Nifi processor or the like) that can create a plain old JAVA object ("POJO") from one or more component specifications. The data collection analytics and events microservice onboarding and design module 132 also can include a web user interface, which can include a component such as an APACHE Nifi project, and can be modified to include some features for connecting to a registry application programming interface for the data collection analytics and events microservice onboarding and design module 132 and can include features for specifying distribution targets and features of distributing the designed flows.

The data collection analytics and events microservice onboarding and design module 132 also can include a web UI application programming interface, which can be provided by another REST application programming interface that can provide programmatic access to command and control a NiFi instance in real time. The data collection analytics and events microservice onboarding and design module 132 also can include a registry application programming interface, which again can include a REST application programming interface that can provide an interface to a registry with operations for saving, versioning, reading NiFi flows and components.

The data collection analytics and events microservice onboarding and design module 132 also can include a distributor application programming interface, which also can be a HTTP REST application programming interface for managing distribution targets (runtime environments that have been registered and are enabled to accept flow design changes that are to be orchestrated in that environment). The data collection analytics and events microservice onboarding and design module 132 also can include a runtime application programming interface (another HTTP REST application programming interface), which can support a runtime environment to a) accept changes on the flow-graph via flow-based programming ("FBP") protocol, and b) generate and distribute blueprints or helm charts (depending on system configuration) based on the flow-graph updates.

The data collection analytics and events microservice onboarding and design module 132 also can include a blueprint generator, which can allow creation of a blueprint from a component spec .json file. The blueprint generator can be used by the runtime application programming interface in some embodiments. The data collection analytics and events microservice onboarding and design module 132 also can include a helm chart generator, which can be configured to generate a helm chart from a given component spec. json file. The helm chart generator can also be embedded in the runtime application programming interface and/or provided as a standalone library for independent usage/test.

The data collection analytics and events microservice onboarding and design module 132 also can include a helm registry (including a chart museum (helm registry)), which can be utilized by the helm chart generator to push the generated charts packages. The data collection analytics and events microservice onboarding and design module 132 also can include an inventory application programming interface, which can provide a) real-time data on services 128 and service components 126, and b) comprehensive details on available service types. The data collection analytics and events microservice onboarding and design module 132 also can include a dashboard, which can provide visibility into running services 128 for operational purposes. The dashboard can query an inventory (e.g., the service catalog 138) for aggregate details on running services 128 and for getting current status information on services 128 and service components 126. Because the data collection analytics and events microservice onboarding and design module 132 can include additional and/or alternative components, it should be understood that these example embodiments are illustrative, and therefore should not be construed as being limiting in any way.

According to various embodiments of the concepts and technologies disclosed herein, the functionality of the data store 136 can be provided by one or more databases, data logs, data stores, server computers, other computing systems, and the like. In the illustrated embodiments, the functionality of the data store 136 can be provided by a data server. It should be understood that this example embodiment is illustrative, and therefore should not be construed as being limiting in any way. The catalog data 134, which can be hosted and/or stored at the data store 136, can include, but is not limited to, component data, metadata, policies, other data, combinations thereof, or the like. These and other operations of the data collection analytics and events microservice onboarding and design module 132 will be illustrated and described in more detail hereinbelow after introducing additional aspects of the operating environment 100.

The data store 136 or the service creation and deployment orchestrator 106 can be configured to receive the catalog data 134, and to create, from the catalog data 134, a service catalog 138. The service catalog 138 can include one or more data structures for defining and describing services 128, service components 126, computing environments 124, and/or other aspects of services and/or infrastructure for supporting one or more services 128, service components 126, and the like. Thus, the service catalog 138 can be accessed by various entities to identify one or more service components 126 and/or services 128 that are to be configured and/or deployed to provide a service that can be requested by a service request 140. It should be understood that this example embodiment is illustrative, and therefore should not be construed as being limiting in any way.

According to various embodiments, the service request 140 can be received from a user or other entity such as, for example, a user device 142. According to various embodiments, the functionality of the user device 142 may be provided by one or more server computers, desktop computers, laptop computers, tablet computers, smartphones, other computing systems, and the like. It should be understood that the functionality of the user device 142 may be provided by a single device, by two or more similar devices, and/or by two or more dissimilar devices. For purposes of describing the concepts and technologies disclosed herein, the user device 142 is described herein as a mobile device such as a smartphone. It should be understood that this embodiment is illustrative, and should not be construed as being limiting in any way. Now that the various components of the operating environment 100 have been introduced, the operation of the various components of the operating environment 100 according to embodiments of the concepts and technologies disclosed herein will be described in detail.

Returning to the service creation and deployment orchestrator 106, the various components thereof will be described. As noted above, the service creation and deployment orchestrator 106 can include the cloud management module 108, which can be configured to function as the core of the service creation and deployment orchestrator 106. Thus, the cloud management module 108 can be responsible for managing and orchestrating resources across a hybrid cloud environment such as the computing environment 124. The cloud management module 108 can interface with public cloud networks such as, for example, Amazon Web Services ("AWS") from providers such as Amazon; Azure services from Microsoft Corporation in Redmond, Washington; Google Cloud services from Google; private clouds built on technologies such as OpenStack or VMware vSphere; combinations thereof; or the like. The cloud management module 108 also can use tools (e.g., OpenTofu) to define infrastructure (e.g., for the services 128 and/or service components 126) using a declarative language and/or to make a solutions cloud provider agnostic and not tightly integrated with a particular cloud provider. It should be understood that in some embodiments, OpenTofu can be configured to support cloud infrastructure providers such as Amazon Web Services, Cloudflare, Microsoft Azure, IBM Cloud, Serverspace, Selectel, Google Cloud Platform, DigitalOcean, Oracle Cloud Infrastructure, Yandex Cloud, VMware vSphere, OpenStack, combinations thereof, or the like. The cloud management module 108 can correspond in various embodiments to a customized frontend graphical user interface ("GUI") that can be interacted with to view, change, and/or modify OpenTofu IaaS code. It should be understood that this example embodiment is illustrative, and therefore should not be construed as being limiting in any way.

The service creation and deployment orchestrator 106 also can include the container orchestrator 110, which can be configured to manage containerized applications (e.g., the services 128, which can include containerized collections of service components 126). In particular, the container orchestrator 110 can include a component that can be built on top of other orchestration software (e.g., in some embodiments Kubernetes may be used) to manage containerized applications across the computing environments 124 or other hybrid cloud environments. In some embodiments, the container orchestrator 110 can provide features like service discovery, load balancing, and automatic scaling, which can be out-of-the-box functionality provided by orchestration software (such as Kubernetes). In some embodiments, the container orchestrator 110 can include an OpenTofu module within the cloud management module 108. It should be understood that this example embodiment is illustrative, and therefore should not be construed as being limiting in any way.

The service creation and deployment orchestrator 106 also can include the configuration manager 112, which can be configured to automate configuration of servers and/or other resources of the computing environments 124. Thus, the configuration manager 112 can provide software provisioning, configuration management, application deployment, and the like for services 128 and/or service components 126. In some embodiments of the concepts and technologies disclosed herein, the configuration manager 112 can be built as a component of the service creation and deployment orchestrator 106 using Ansible, Puppet, Chef, or the like. It should be understood that this example embodiment is illustrative, and therefore should not be construed as being limiting in any way.

The service creation and deployment orchestrator 106 also can include the infrastructure catalog 114, which can be configured to list all infrastructure that can be provisioned by the service creation and deployment orchestrator 106 and/or one or more components thereof. Thus, the infrastructure can list all infrastructure that can be provisioned on the computing environments 124 and therefore can include, for example, virtual machines, containers, databases, storage volumes, and the like. It should be understood that this example embodiment is illustrative, and therefore should not be construed as being limiting in any way.

The service creation and deployment orchestrator 106 also can include the security and compliance module 116, which can be configured to enforce one or more security policies and/or to ensure compliance with regulations for security. The security and compliance module 116 can include, for example, one or more firewalls, intrusion detection systems, deep packet inspection entities, encryption and decryption tools, compliance auditing tools, and the like. The security and compliance module 116 can include, in some embodiments, application programming interface integrations that can be used to codify rules/guidelines in various cloud security posture systems, so as to be able to embed security into deployments of the services 128 and/or service components 126. It should be understood that this example embodiment is illustrative, and therefore should not be construed as being limiting in any way.

The service creation and deployment orchestrator 106 also can include the cloud broker 118, which can be configured to decide where to provision resources (or other infrastructure) for the service 128 and/or service components 126. The cloud broker 118 can be configured, in various embodiments, to decide where to provision the resources based on various considerations such as, for example, cost, performance, availability, and the like. The cloud broker 118 can interface with the cloud management module 108 and the service catalog 138 in various embodiments. The cloud broker 118 also can have simple application programming interface integrations with other cloud cost optimizers and calculators, as is generally understood. It should be understood that this example embodiment is illustrative, and therefore should not be construed as being limiting in any way.

The service creation and deployment orchestrator 106 also can include the monitoring module 120, which can be configured to provide monitoring and management for the service creation and deployment orchestrator 106. Thus, for example, the monitoring module 120 can be configured to monitor performance of the service creation and deployment orchestrator 106 and the resources managed by the service creation and deployment orchestrator 106 (e.g., the services 128, the service components 126, the computing environments 124, and the like). The monitoring module 120 can be configured to detect issues, generate alerts, and automate remediation actions. In some embodiments of the concepts and technologies disclosed herein, the monitoring module 120 can include specialized artificial intelligence, machine learning, and/or generative artificial intelligence for performing threshold detection, surge detection, volume-based anomaly detection, and for various key performance indicators, counters, fault monitoring data, performance monitoring data, as well as data from the services 128 deployed by the service creation and deployment orchestrator 106.

According to various embodiments of the concepts and technologies disclosed herein, the monitoring module 120 can be configured to enable the monitoring by configuring the services 128 and/or service components 126 to report to the service creation and deployment orchestrator 106. For example, the monitoring module 120 can create webhooks or polling operations, which can be used to connect service application programming interface 144 associated with the services 128 and/or service components 126 with an orchestrator application programming interface 146 associated with the monitoring module 120, thereby enabling delivery of reports, monitoring data, and/or metrics (hereinafter "reports") 148 to the monitoring module 120. The monitoring module 120 can update metrics for the deployed services 128 and/or service components 126 and/or track performance thereof. It should be understood that this example embodiment is illustrative, and therefore should not be construed as being limiting in any way.

The service creation and deployment orchestrator 106 also can include the automation engine 122, which can be configured to automate tasks such as provisioning and deprovisioning of service-level resources. In some embodiments of the concepts and technologies disclosed herein, the automation engine 122 can interface with the cloud management module 108, the container orchestrator 110, and the configuration manager 112 to trigger or complete lower-level resource provisioning and deprovisioning tasks. It should be understood that this example embodiment is illustrative, and therefore should not be construed as being limiting in any way.

In practice, the service creation and deployment orchestrator 106 can be configured to receive a service request 140, as noted above. It should be understood that the service request 140 can be transmitted to the service creation and deployment orchestrator 106 (e.g., by a user device 142 or another device) in some embodiments. In some other embodiments, the service request 140 can be created via interactions with the service creation and deployment orchestrator 106 (e.g., by the user device 142 and/or other devices), for example via a portal, application programming interface, or other functionality for interacting with the service creation and deployment orchestrator 106. As such, the illustrated embodiment of FIG. 1A, which shows a service request 140 being provided to the service creation and deployment orchestrator 106 by the user device 142 is illustrative and should not be construed as being limiting in any way.

The service creation and deployment orchestrator 106 can be configured to analyze the service request 140. Based on the analysis of the service request 140, the service creation and deployment orchestrator 106 can determine the functions and/or functionality being requested by way of the service request 140, and to identify one or more components of the service 128 being requested by way of the service request 140. For example, if the service request 140 requests a service 128 for receiving data from a data source, operating on the data, and storing a report or summary of the data, the service creation and deployment orchestrator 106 can determine that the service request 140 is requesting a service 128 that includes at least three functions, namely a first function for recognizing received data as being data of a certain type; a second function for performing a particular operation on the data and/or generating a report or summary of the data; and a third function for storing the report or summary of the data. It should be understood that this example embodiment is illustrative, and therefore should not be construed as being limiting in any way.

The service creation and deployment orchestrator 106 can be configured to access or query the service catalog 138 based on the identified functions. For example, the service creation and deployment orchestrator 106 can perform a query against the service catalog 138, for example, to find available data storage components for the third function in the above example. If more than one data storage function is available and/or otherwise identified in the service catalog 138, the service creation and deployment orchestrator 106 can be configured to select one of the data storage functions based on various considerations (e.g., cost, availability, relocation costs, location, resource usage, etc.); at random (e.g., select one of the options without further analysis);

according to preferences (e.g., a particular type of storage, a particular location, etc.); based on other considerations; combinations thereof; or the like. Because the service components 126 can be selected in additional and/or alternative manners, it should be understood that these example embodiments are illustrative, and therefore should not be construed as being limiting in any way.

Once the identified service components 126 that can cooperatively provide the requested service 128 are identified by the service creation and deployment orchestrator 106, the service creation and deployment orchestrator 106 can configure the service components 126. For example, the service creation and deployment orchestrator 106 can configure the service components 126 regarding inputs, outputs, and the like. Thus, the service creation and deployment orchestrator 106 can be configured to customize the service components 126 based on the function of the service 128, for example, and/or based on other considerations. For each service component 126, the service creation and deployment orchestrator 106 can identify infrastructure and infrastructure location(s) that will host and/or provide the service component 126. Thus, the service creation and deployment orchestrator 106 can identify the hardware and/or software elements that will provide the service component 126 (e.g., one or more virtual machines, services, or the like on one or more of the computing environments 124).

The service creation and deployment orchestrator 106 also can configure one or more security policies for the service component 126. Thus, for example, the service creation and deployment orchestrator 106 can determine what, if any, security policies are to be implemented with respect to the service component 126 and/or the infrastructure providing the service component 126. For example, the service creation and deployment orchestrator 106 can determine that a firewall, deep packet inspection, filter, or the like is to be applied to the service component 126 and/or the infrastructure hosting and/or executing the service component 126. Other security policies can include the examples illustrated and described herein including, but not limited to, filter lists, port blocking, forwarding protocols and/or limits, access control, combinations thereof, or the like.

The service creation and deployment orchestrator 106 can prepare the service component 126 for deployment. In some embodiments, this preparation can include preparing an image, commands, package, or the like that can be sent to one or more controllers, orchestrators, or other entities associated with the computing environments 124. As shown in FIG. 1A, these and/or other types of data can be provided to the computing environments (and are collectively illustrated) as the service components 126 that are shown as being provided by the service creation and deployment orchestrator 106 (and server computer 102) to the computing environments 124. Because various types of data can be provided to the computing environments 124 by the service creation and deployment orchestrator 106 (e.g., commands, images, packages, objects, code, combinations thereof, or the like), it should be understood that this illustrated example embodiment is illustrative, and therefore should not be construed as being limiting in any way.

The service creation and deployment orchestrator 106 can determine if the service 128 being deployed has additional service components 126 (e.g., in addition to the service component 126 prepared for deployment). For each service component 126 of the service 128, the service creation and deployment orchestrator 106 can repeat the operations for configuring the service component 126, identifying infrastructure and infrastructure location, configuring security policies, and preparing for deployment. Once the service creation and deployment orchestrator 106 determines that all service components 126 have been prepared for deployment, the service creation and deployment orchestrator 106 can trigger deployment of the service components 126. Thus, the service creation and deployment orchestrator 106 can generate commands, packages, images, and the like and/or instruct other entities to perform operations for deploying the service components 126 to the computing environments 124. As noted above, the service components 126 can be deployed to one or more computing environments 124 according to various embodiments of the concepts and technologies disclosed herein. It should be understood that this example embodiment is illustrative, and therefore should not be construed as being limiting in any way.

The service creation and deployment orchestrator 106 also can be configured to monitor security issues associated with the service 128. In particular, the service creation and deployment orchestrator 106 can be configured to monitor the service 128 upon instantiation, for example, to detect deployment of the service components 126 (and/or activation or instantiation of the service 128). The service creation and deployment orchestrator 106 can initiate monitoring of the service 128 (e.g., by invoking the security and compliance module 116 and/or the monitoring module 120, receiving reports 148 from the service 128, or the like). The service creation and deployment orchestrator 106 can determine if any issues (e.g., faults, errors, security issues, or the like) are detected with respect to the service 128. This monitoring can continue until any issues are detected or until execution of the service 128 is terminated. If the service creation and deployment orchestrator 106 detects any issues, the service creation and deployment orchestrator 106 can obtain fault resolution policies for the service 128 and/or service components 126.

According to various embodiments of the concepts and technologies disclosed herein, the service catalog 138 can include fault resolution policies for the services 128 and/or service components 126. Thus, the service creation and deployment orchestrator 106 can obtain the fault resolution policies by querying or accessing the service catalog 138, in some embodiments. Of course, it should be understood that in some other embodiments the service creation and deployment orchestrator 106 can access one or more security policy logs and/or other data structures that can be stored at the data store 136, the server computer 102, and/or elsewhere. The service creation and deployment orchestrator 106 also can be configured to remediate the issues identified and/or to trigger other devices or entities to remediate the issues. In some embodiments, the service creation and deployment orchestrator 106 can modify the service components 126, the infrastructure, and/or other aspects of the service components 126 to remediate the faults. Because other operations can be performed to remediate the detected issues, it should be understood that these example embodiments are illustrative, and therefore should not be construed as being limiting in any way.

The service creation and deployment orchestrator 106 also can be configured to monitor performance of the service 128 and to update the service 128 and/or service components 126 if appropriate. In particular, the service creation and deployment orchestrator 106 can be configured to monitor the service 128 upon instantiation, for example, to detect deployment of the service components 126 and/or activation or instantiation of the service 128. The service creation and deployment orchestrator 106 can initiate monitoring of the service 128 (e.g., by invoking the monitoring module 120, receiving reports 148 from the service 128, or the like) and can obtain performance metrics and/or policies for the service 128. The service creation and deployment orchestrator 106 can review the performance metrics (e.g., key performance indicators, utilization, or the like) and one or more performance policies for the service 128 to determine if any updates should be made to the service 128 and/or the service components 126. If the service creation and deployment orchestrator 106 determines that any updates should be made to the service 128 and/or service components 126, the service creation and deployment orchestrator 106 can update the service components 126.

Thus, the service creation and deployment orchestrator 106 can make changes to the service components 126 (and thereby the service 128) during execution of the service 128. This can be enabled by, among other things, supporting cross-platform services 128 (e.g., by locating service components 126 on any number of computing environments 124 and/or infrastructure associated therewith). The service components 126 can be updated by the service creation and deployment orchestrator 106 (e.g., by deploying and/or triggering deployment of updated service components 126, patches, or the like). Thus, the service 128 can be updated to address performance issues by the service creation and deployment orchestrator 106 at substantially any time. It should be understood that this example embodiment is illustrative, and therefore should not be construed as being limiting in any way. Although not labeled in FIG. 1, it should be understood that the data collection analytics and events microservice onboarding and design module 132 can include various application programming interfaces as illustrated and described herein.

According to various embodiments of the concepts and technologies disclosed herein, the service creation and deployment orchestrator 106 can integrate with other marketplaces. For example, with regard to artificial intelligence models, marketplaces like TensorFlow Hub, Pytorch Hub, ONNX Model Zoo, Hugging Face Model Hub, other open LLM/Gen AI model hubs, Model Depot.io and the like may be used and adapters can run commands to fetch or pull the models and wrap the model with microservice wrappers. These adapters can be implemented using Python, or any other programming or scripting language to call the necessary application programming interfaces. Furthermore, these adapters can be set up to include the correct versions of models, wherever applicable, which can include calling different application programming interfaces with a version parameter or the like, which can be passed to the adapters to fetch the correct versions of the models. It should be understood that this example embodiment is illustrative, and therefore should not be construed as being limiting in any way.

Acumos can onboard models created in a variety of frameworks like Pyspark, Tensorflow, Keras, Sklearn, etc., and also different languages like Python, Java, R, H2o, etc. For Java, Acumos can already onboard simple snippets of code doing 'X' not necessarily AI/ML. The onboarding process can be used to convert the models to Acumos microservices that can be converted into service components 126 via an Acumos adapter. Thus, the service creation and deployment orchestrator 106 can be configured to integrate with many marketplaces and many types of models doing various different things and written in various languages or frameworks and bring them all in to wrap them as a service 128 (e.g., including compliant microservices or components that can be used to design network services—referred to herein as service components 126). It should be understood that this example embodiment is illustrative, and therefore should not be construed as being limiting in any way.

The spec files and/or microservices arrive in the data collection analytics and events microservice onboarding and design module 132 (e.g., as the runtime data 130), the spec files and/or microservices can be validated by conversion to Nifi plain old Java objects and can become available if marked as shareable. To enable such functionality, the service creation and deployment orchestrator 106 can be configured to communicate with various application programming interfaces such as a registry application programming interface, a web user interface, and/or a web application programming interface as illustrated and described herein. It should be understood that this example embodiment is illustrative, and therefore should not be construed as being limiting in any way.

FIG. 1A illustrates one server computer 102, one network 104, two computing environments 124, one service 128 (including two service components 126), one data collection analytics and events microservice onboarding and design module 132, one data store 136, one user device 142, one service application programming interface 144, and one orchestrator application programming interface 146. It should be understood, however, that various implementations of the operating environment 100 can include one or more than one server computer 102; one or more than one network 104; one, two, or more than two computing environments 124; one or more than one service 128 (including one, two, or more than two service components 126); one or more than one data collection analytics and events microservice onboarding and design module 132; zero, one, or more than one data store 136; zero, one, or more than one user device 142; and any number of application programming interfaces. As such, the illustrated embodiment should be understood as being illustrative, and should not be construed as being limiting in any way.

Figure 1B:
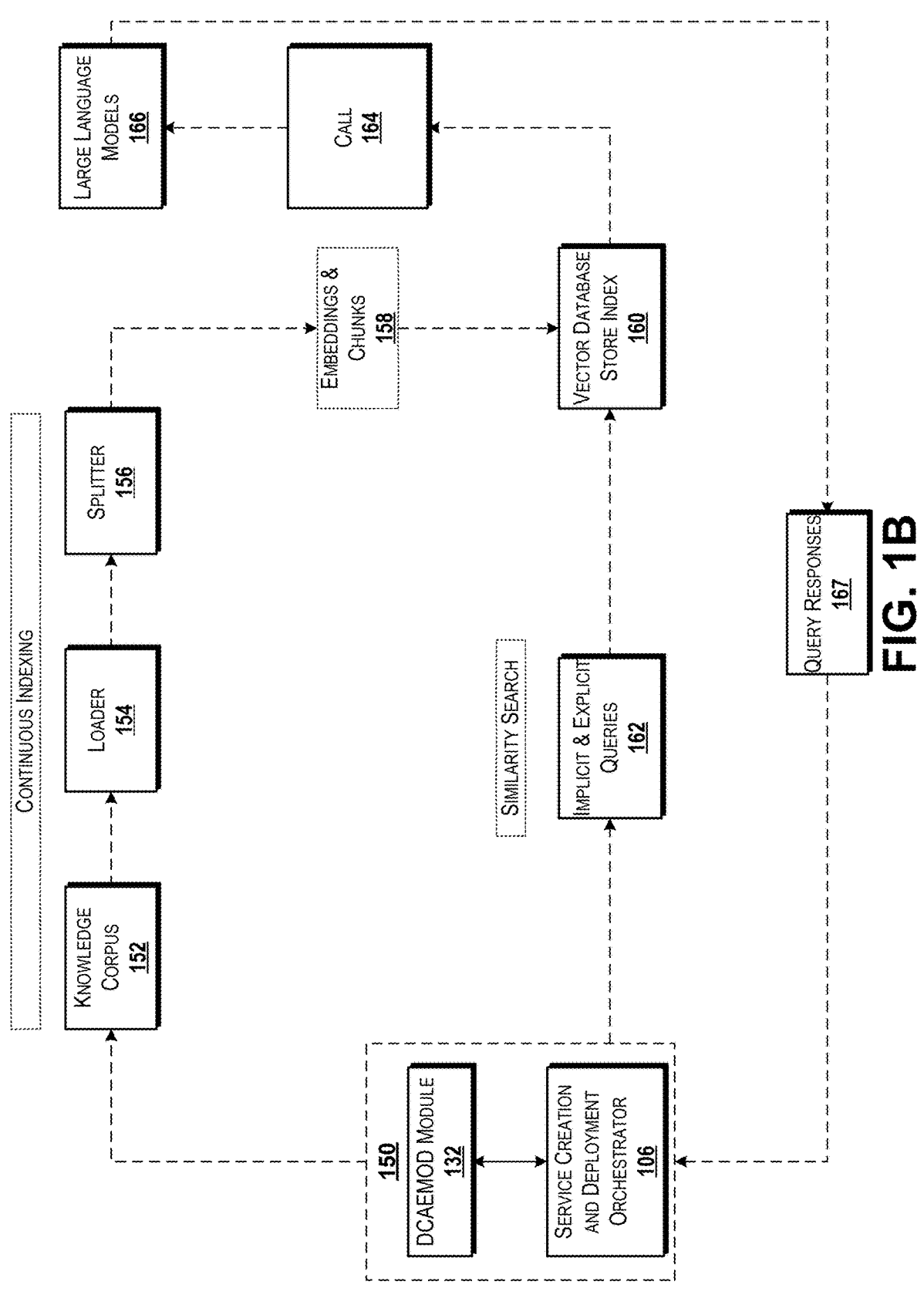
FIG. 1B is a line diagram schematically illustrating the use of large language models at design time, according to some example embodiments of the concepts and technologies described herein.

Turning now to FIG. 1B, additional aspects of design time using the service creation and deployment orchestrator 106 and/or data collection analytics and events microservice onboarding and design module 132 will be illustrated and described in detail. According to various embodiments of the concepts and technologies disclosed herein, creation of services 128 and/or service components 126 at a design time phase can be supported through the use of large language model approach. The use of large language models can help aid in efficient familiarization with the platform and help discover microservices during design time. As shown in FIG. 1B, the logically connected data collection analytics and events microservice onboarding and design module 132 and service creation and deployment orchestrator 106 can collectively operate as service creation and deployment tool 150. It should be understood that this example embodiment is illustrative, and therefore should not be construed as being limiting in any way.

During design time, a continuous indexing process can occur. Namely, runtime data 130 can be fed (e.g., as a knowledge corpus 152) to a loader 154 and splitter 156, which can collectively output embeddings and chunks 158 to a vector database store index 160. The service creation and deployment tool 150 also can be used to create implicit and explicit queries 162 (e.g., a search for services 128 that may satisfy a service request 140 or the like). The implicit and explicit queries 162 can also be provided to the vector database store index 160, and based on the implicit and explicit queries 162 and the embeddings and chunks 158, a local or remote application programming interface call, prompt, or query with context (labeled "call 164" in FIG.

1B) can be provided to a set of large language models 166. The large language models 166 can operate on the call 164 and output one or more query responses 167.

The use of the large language models 166 can provide three benefits in some embodiments. First, the large language models 166 can provide an ability to search for microservices and/or component metadata to answer questions about the microservice based on the metadata (e.g., the purpose of the microservices and/or components, the intent of the microservices and/or components, etc.). Furthermore, the large language models 166 can determine which microservices in the current instance of the service creation and deployment orchestrator 106 can be inputs or outputs of the current microservice in question. Finally, given a design intent (e.g., from the service request 140), the service creation and deployment orchestrator 106 can analyze all the microservices available and identify and/or create a flow that could help fulfill the desired design intent (per the service request 140). In the event that the design flow cannot be fulfilled by the microservices in the current instance of the service creation and deployment orchestrator 106, an output to that effect may be generated. Thus, the confidence above which the service creation and deployment orchestrator 106 can identify a tunable parameter for large language models 166 that will only provide a flow when identified with a high degree of confidence. It should be understood that this example embodiment is illustrative, and therefore should not be construed as being limiting in any way.

The above features can be implemented through the data collection analytics and events microservice onboarding and design module 132 and can be enabled to enrich the metadata using fields such as "Purpose," "Category," "Terms," "Connects To," "Task," etc., to the spec file schema. The metadata of all the microservices in the current instance of the service creation and deployment orchestrator 106 instance can be available in a semi-structured format like .csv or .json to the large language model 166, which may run on the same environment as the service creation and deployment orchestrator 106 and/or may be running remotely, as the context. If the context is too large, the large language model prompting procedure may also involve the vector database store index 160, which can be configured to enable similarity searching to find relevant context (relevant chunks) before the large language model call, e.g., the call 164. It should be understood that this example embodiment is illustrative, and therefore should not be construed as being limiting in any way.

From the above, it can be appreciated that large language models 166 and retrieval augmented generation powered design time could help ease the design process. Also, the retrieval augmented generation pipeline can be implemented easily using open-source vector databases such as, for example, Milvus, Weaviate, ChromaDB, etc., and the Lang-Chain Framework. The large language models 166 can include open source models (e.g., DBRX, Llama-2, Mistral's Mixtral, Falcon, or the like) and/or closed source models (e.g., AskATT, OpenAI's GPT4 models, or the like). Fined tuning of models at a regular cadence on new data may enable achieving even higher search performance. If already connected to (which we will see later), other marketplaces, the large language model searching may include even microservices and models not currently available in the current instance of the service creation and deployment orchestrator 106. It should be understood that this example embodiment is illustrative, and therefore should not be construed as being limiting in any way.

Figure 1C:
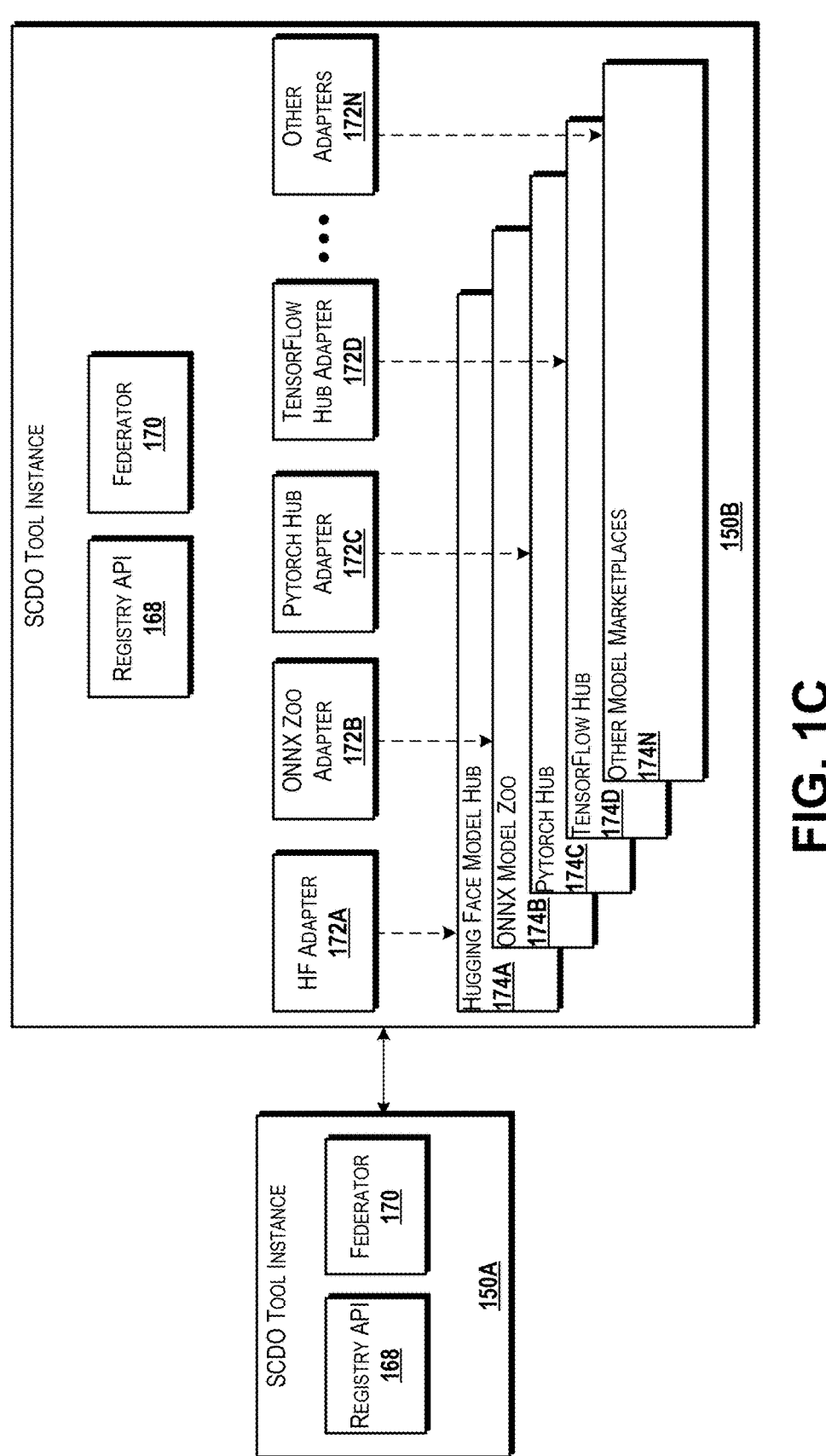
FIG. 1C is a line diagram schematically illustrating example embodiments of multiple instances of the service creation and deployment orchestrator federating with one another, according to some example embodiments of the concepts and technologies described herein.

Turning now to FIG. 1C, additional aspects of the concepts and technologies disclosed herein will be described. In particular, as can be appreciated with reference to FIG. 1C, the service creation and deployment tool 150 can include a registry application programming interface 168 and a federator 170. It can be appreciated that the multiple instances of the service creation and deployment tool 150 can operate on multiple environments and/or can be associated with and/or operated by multiple providers in some embodiments. Other than the party operating the instances of the service creation and deployment tool 150 and/or the computing environments 124 on which these instances may operate, it can be appreciated that these instances may be substantially similar and/or identical in terms of functionality and the like. It can be appreciated that these multiple providers could be any parties and/or individual entities (e.g., private and/or governmental entities, businesses, network operators, other entities, or the like) that could decide for any reason to engage in federation and/or cooperation (e.g., these entities may be located in diverse geographic locations, different networks, use different protocols and/or hardware, or the like). Such an approach can enable and/or rely on reuse of information across entities, thereby improving the discovery and/or creation of services 128 for multiple entities in some embodiments. It should be understood that this example embodiment is illustrative, and therefore should not be construed as being limiting in any way.

The service creation and deployment tool 150 be configured to integrate with many other marketplaces. In some embodiments, for example, where the service creation and deployment tool 150 and/or its components (e.g., the data collection analytics and events microservice onboarding and design module 132 and/or service creation and deployment orchestrator 106) are provided by artificial intelligence and/or marching learning, one or more instances of the service creation and deployment tool 150 can use adapters 172A-N (collectively and/or generically referred to as "adapters 172" herein) to connect with marketplaces 174A-N (collectively and/or generically referred to as "marketplaces 174" herein). Example marketplaces 174 can include, for example, a Hugging Face Model Hub 174A, an ONNX model zoo 174B, a Pytorch Hub 174C, a TensorFlow Hub 174D, and/or other open large language model, generative artificial intelligence model hubs, Model Depot.io, and/or the like (other model marketplaces 174N). According to various embodiments of the concepts and technologies disclosed herein, each of these integrations can be supported by adapters 172 that can run commands to fetch or pull the models and wrap the model with microservice wrappers. These adapters 172 can be implemented using Python, in some embodiments, or other programming or scripting language to call the necessary APIs. These adapters 172 can be set up to include the correct versions of models wherever applicable. In some instances, this entails calling slightly different APIs with a version parameter, etc., any and/or all of which can be passed to the adapters 172 to fetch the correct versions of the models in some embodiments. It should be understood that this example embodiment is illustrative, and therefore should not be construed as being limiting in any way.

In some embodiments, Acumos can be configured to onboard models created in a variety of frameworks like Pyspark, Tensorflow, Keras, Sklearn, etc., and/or other languages such as Python, Java, R, H2o, or the like. For Java, Acumos can be configured to onboard snippets of code doing 'X' not necessarily using artificial intelligence and/or machine learning. The onboarding process can be configured to convert the snippets of code to Acumos microservices that can be converted into other types or formats of microservices via an Acumos adapter. It should be understood that this example embodiment is illustrative, and therefore should not be construed as being limiting in any way. As such, it can be appreciated that the service creation and deployment tool 150 (and/or instances thereof) can be configured to integrate with many marketplaces 174 and many types of models doing various different things and written in various languages or frameworks, and to wrap these models as compliant microservices or components that can be used to design network services such as the services 128 illustrated and described herein. It should be understood that this example embodiment is illustrative, and therefore should not be construed as being limiting in any way.

Figure 1D:
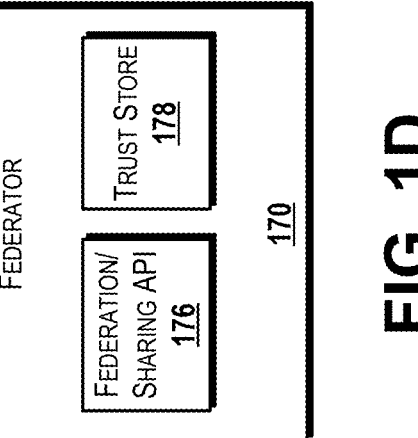
FIG. 1D is a line diagram illustrating how the service creation and deployment orchestrator can manage services across public and private clouds, according to some example embodiments of the concepts and technologies described herein.

Turning now to FIG. 1D, additional aspects of the service creation and deployment tool 150 will be described in detail. In particular, FIG. 1D illustrates the federator 170 of the service creation and deployment tool 150 and is used to describe some aspects of the federation between instances of the service creation and deployment tool 150 illustrated and described herein. In particular, as explained above, runtime data 130 can be provided to the data collection analytics and events microservice onboarding and design module 132 for analysis in accordance with various embodiments of the concepts and technologies disclosed herein. The runtime data 130 can include, for example, spec files, microservices, and the like. Then the runtime data 130 arrives at the data collection analytics and events microservice onboarding and design module 132, the data can be validated by conversion to Nifi plain old Java objects ("POJOs") in some instances. After conversion, these Nifi POJOs can become available in a component called the federator 170, if marked as shareable. It can be appreciated that the shareable field can be included as a field in the spec files in some embodiments. It should be understood that this example embodiment is illustrative, and therefore should not be construed as being limiting in any way.

To enable this, the federator 170 can communicate with the registry application programming interface 168 (of the data collection analytics and events microservice onboarding and design module 132 (as shown as part of the service creation and deployment tool 150 in FIG. 1C)), web user interface, and web application programming interfaces. The federator 170 also can be accessed in some embodiments from the Web UI. The federator 170 can include functions to support microservice/component federation with other instances of the service creation and deployment tool 150. It should be understood that this example embodiment is illustrative, and therefore should not be construed as being limiting in any way.

The architecture of the federator 170 can involve peering to connect with other instances of the service creation and deployment tool 150 in some embodiments. In some instances, first peering intents can be negotiated by spoken or written communication, and participating instances can share the public secure socket layer ("SSL") certificates for the federation application programming interface endpoints and the other instance of the service creation and deployment tool 150 can install the certificates in its federation gateway SSL trust store 178. Then the federation peer of the instance of the service creation and deployment tool 150 can be added. This peering can be implemented using secure (https) REST API calls to the federation endpoint of the data collection analytics and events microservice onboarding and design module 132 in some embodiments. The federation or sharing application programming interface also can be part of the federator 170 and can be configured to accept spec files from trusted peers and forward the spec files to the onboarding application programming interface in some embodiments. This sharing can be further be refined to include sharing of specific catalogs and not all models between two peers if desired. This approach may require appropriate modifications to the federation application programming interface endpoint of the federator 170 in some embodiments. It should be understood that this example embodiment is illustrative, and therefore should not be construed as being limiting in any way. It can be appreciated that the above features can enable substantially continuous and automatic sharing between many instances of the service creation and deployment tool 150, any and/or all of which may elect to engage in peering/federation. It should be understood that this example embodiment is illustrative, and therefore should not be construed as being limiting in any way.

With collective reference now to FIGS. 1A-1D, it should be understood that embodiments of the service creation and deployment tool 150 (which can include the data collection analytics and events microservice onboarding and design module 132 and the service creation and deployment orchestrator 106) can include multi-cloud and/or hybrid-cloud orchestrators. These embodiments can enable deployment of services 128 with components and/or microservices that can run in in different clouds and/or cloud environments (e.g., the computing environments 124 illustrated and described in FIG. 1A). Such embodiments could enable, for example, a data ingester microservice in Azure and an Anomaly detection service in AWS and alerting back into Azure. It should be understood that this example embodiment is illustrative, and therefore should not be construed as being limiting in any way.

Embodiments of the concepts and technologies disclosed herein that enable multi-cloud and/or and hybrid-cloud deployment can be indicated in the final generated deployment design because this could be described by the deployment/operations personnel in an interface (e.g., a user interface of the data collection analytics and events microservice onboarding and design module 132 or some other location such as the dashboard illustrated and described herein). It should be understood that this example embodiment is illustrative, and therefore should not be construed as being limiting in any way. Additionally, it can be appreciated that the data collection analytics and events microservice onboarding and design module 132 and/or service creation and deployment orchestrator 106 can be implemented using artificial intelligence and/or machine learning for the creation of and/or management of the network 104 and its various services 128 on multiple private and/or public cloud environments. Such an approach can enable sixth generation and beyond network support for these tools. It should be understood that this example embodiment is illustrative, and therefore should not be construed as being limiting in any way.

Figure 2:
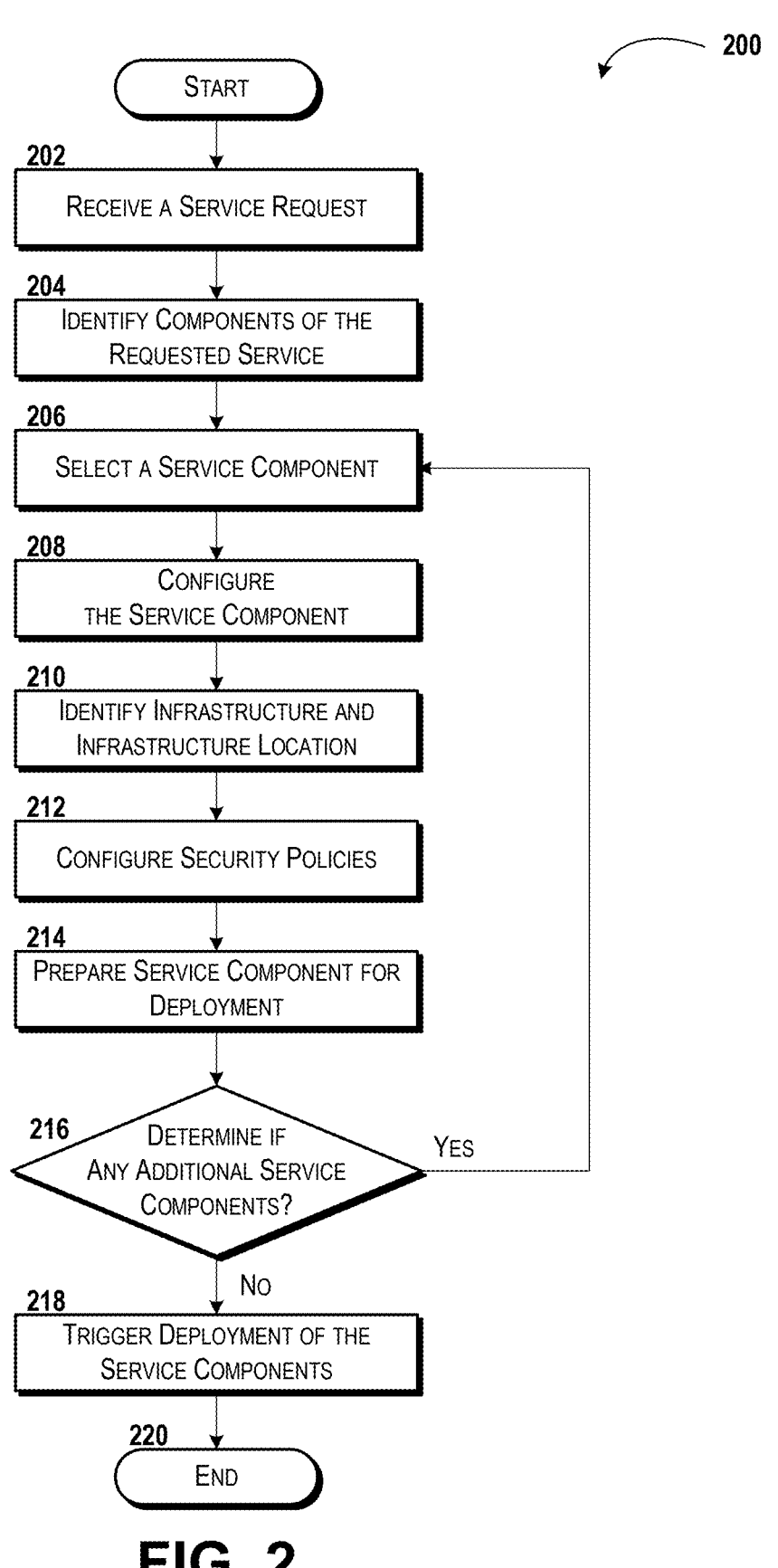
FIG. 2 is a flow diagram showing aspects of a method for creating and deploying a service, according to an illustrative embodiment of the concepts and technologies described herein.

Turning now to FIG. 2, aspects of a method 200 for creating and deploying a service 128 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the service creation and deployment orchestrator 106. It should be understood that additional and/or alternative devices and/or network nodes can provide the functionality described herein via execution of one or more modules, applications, and/or other software including, but not limited to, the service creation and deployment orchestrator 106. Thus, the illustrated embodiments are illustrative, and should not be viewed as being limiting in any way.

The method 200 begins at operation 202. At operation 202, the server computer 102 can receive a service request 140. According to various embodiments of operation 202, the server computer 102 can receive the service request 140 from a user or other entity such as, for example, a user device 142. In some embodiments, the service request 140 can be transmitted to the server computer 102 (e.g., by a user device 142 or another device). In some other embodiments, the service request 140 can be created at and/or by the server computer 102. For example, the service request 140 can be created at the server computer 102 via interactions with the service creation and deployment orchestrator 106 (e.g., by the user device 142 and/or other devices), for example via a portal, application programming interface, or other functionality for interacting with the service creation and deployment orchestrator 106. In yet other embodiments, receiving the service request 140 can correspond to the server computer 102 receiving a service call, a command, or other functionality for invoking a service creation and deployment process as illustrated and described herein. Because the server computer 102 can determine that a service 128 should be created and/or deployed in additional and/or alternative manners, it should be understood that these example embodiments are illustrative, and therefore should not be construed as being limiting in any way.

From operation 202, the method 200 can proceed to operation 204. At operation 204, the server computer 102 can identify one or more components (e.g., functions, processes, routines, or the like) of the requested service 128. In particular, the server computer 102 can be configured to analyze the service request 140 received in operation 202. Based on the analysis of the service request 140, the server computer 102 can determine one or more functions and/or functionality being requested by way of the service request 140. In various embodiments of the concepts and technologies disclosed herein, the service creation and deployment orchestrator 106 can be configured to analyze the service request to determine design intent. Namely, the service creation and deployment orchestrator 106 can be configured to determine a flow (of and among service components 126) that will provide the requested service 128. This can be accomplished in various embodiments of the concepts and technologies disclosed herein by including, in the service catalog 138, service components 126 (e.g., microservices, service functions, etc.) with metadata that can express, for each service component 126, a purpose, intent, category, terms, connects to information, receives from information, task, and the like, which can be understood by the service creation and deployment orchestrator 106 and used to create the service 128 from the service components 126. It should be understood that this example embodiment is illustrative, and therefore should not be construed as being limiting in any way.

In various embodiments of the concepts and technologies disclosed herein, the service creation and deployment orchestrator 106 can be powered by large language models and/or other functionality as illustrated and described herein to discover microservices (service components 126). Thus, embodiments of the concepts and technologies disclosed herein use large language model design to enable searching for service components 126 from the service catalog 138 using metadata to answer questions about the microservice based on the metadata (e.g., its purpose, intent, connects to, connects from, etc.), identification of what service components 126 can send to, or receive from, another service component 126, and design of a flow (based on the service request 140) that can provide the intent of the requested service 128. In some embodiments of the concepts and technologies disclosed herein, the metadata associated with the service components 126 (as represented in the service catalog 138) can be available in a semi-structured format such as .csv or .json to the large language model 166. It should be understood that this example embodiment is illustrative, and therefore should not be construed as being limiting in any way.

Thus, the server computer 102 also can identify one or more components of the service 128 being requested by way of the service request 140. In various embodiments, the server computer 102 can identify operations associated with the service 128 and identify those operations as functions as illustrated and described herein. It should be understood that the components identified in operation 204 can correspond to one or more service components 126 illustrated and described herein. Because the components of the service 128 (e.g., the service components 126) can be determined in additional and/or alternative manners, it should be understood that the above examples are illustrative, and therefore should not be construed as being limiting in any way.

From operation 204, the method 200 can proceed to operation 206. At operation 206, the server computer 102 can select a service component 126 (from the components identified in operation 204). According to various embodiments, operation 206 can correspond to the server computer 102 selecting a service component 126 from one or more service components 126 of the service 128 requested in operation 202 for purposes of preparing the service components 126 and/or service 128 for creation and/or deployment. It should be understood that this example embodiment is illustrative, and therefore should not be construed as being limiting in any way.

According to various embodiments of the concepts and technologies disclosed herein, the server computer 102 can select the service component 126 in operation 206 from the service catalog 138. In particular, the server computer 102 can be configured to access or query the service catalog 138 based on the identified functions in some embodiments. In some other embodiments, the server computer 102 can trigger a query or search of the service catalog 138 by other entities. The server computer 102 can, for example, perform or trigger a query against the service catalog 138 to identify a service component 126 that is to be included in the service 128. The selection of a service component 126 in operation 206 can be random in a first operation and/or based on various considerations, and it will be appreciated that operation 206 can be iterated (along with other operations) for each service component 126 included in the service 128 according to various embodiments of the concepts and technologies disclosed herein. It should be understood that this example embodiment is illustrative, and therefore should not be construed as being limiting in any way.

From operation 206, the method 200 can proceed to operation 208. At operation 208, the server computer 102 can configure the service component 126 selected in operation 206. For example, the server computer 102 can configure the service components 126 regarding inputs to the service component 126, outputs from the service component 126, configurable operations of the service components 126, and the like. Thus, for example, the server computer 102, which can be familiar with the one or more service components 126 to be included in the service 128 and the overall flow and/or topology of the service 128 and the service components 126, can configure an input of the service component 126, an output of the service component, an input format and/or protocol for the service component 126, an output format and/or protocol for the service component 126, and/or other aspects of the service component 126. Because other aspects of the service component 126 can be configured as illustrated and described herein, it should be understood that these examples are illustrative, and therefore should not be construed as being limiting in any way.

From operation 208, the method 200 can proceed to operation 210. At operation 210, the server computer 102 can identify infrastructure and infrastructure location(s) associated with the service component 126. Thus, in operation 210, the server computer 102 can identify what hardware, software, and/or other resources host the service component 126, the geographic and/or network locations of the infrastructure that is to support the service component 126, what network functions will be accessed and/or used by the service component 126, and/or other hardware, software, and/or other resources that may be configured with respect to the service component 126. Thus, the server computer 102 can identify the hardware and/or software elements that will provide, host, and/or communicate with the service component 126 (e.g., one or more virtual machines, services, or the like on one or more of the computing environments 124), where these hardware, software, and/or other resources are located, and/or how these and/or other infrastructure supporting the service component 126 will communicate with each other.

From operation 210, the method 200 can proceed to operation 212. At operation 212, the server computer 102 can configure one or more security policies for the service component 126. In operation 212, the server computer 102 can determine what, if any, security policies are to be implemented with respect to the service component 126 and/or the infrastructure providing the service component 126. For example, the server computer 102 can determine, in operation 212, one or more security elements that are to be created and/or connected to the service component 126 such as, for example, a firewall, a deep packet inspection element, a traffic filter, authentication elements, or the like. It should be understood that the security elements may be applied to and/or included in the service component 126 and/or may be applied to the infrastructure that hosts and/or executes the service component 126. Furthermore, it should be understood that other security policies and/or elements can include, for example, filter lists, port blocking and/or allowing, forwarding protocols and/or limits, address translation elements, access control entities and/or procedures, combinations thereof, or the like.

From operation 212, the method 200 can proceed to operation 214. At operation 214, the server computer 102 can prepare the service component 126 for deployment. In some embodiments, operation 214 can include the server computer 102 preparing an image for installation on a virtual machine and/or other element at the computing environments 124, preparing one or more commands to install and/or instantiate the service component 126, preparing and/or creating one or more software package for the service component 126, combinations thereof, or the like. It can be appreciated that the data and/or instructions created by the server computer 102 in operation 214 can be sent or deployed to one or more controllers, orchestrators, or other entities associated with the computing environments 124 to install and/or instantiate the service component 126 (as will be explained with regard to operation 218). In various embodiments of the concepts and technologies disclosed herein, however, the server computer 102 can prepare each service component 126 before deploying any service components 126. In some other embodiments of the concepts and technologies disclosed herein, the server computer 102 may deploy or trigger deployment of the service components 126 as prepared.

From operation 214, the method 200 can proceed to operation 216. At operation 216, the server computer 102 can determine if any additional service components 126 of the service 128 remain to be configured and prepared for deployment. If the server computer 102 determines, in operation 216, that additional service components 126 remain for configuration and/or deployment, the method 200 can return to operation 206, at which the server computer 102 can select another service component 126 that has not yet been configured and/or prepared for deployment. Thus, it can be appreciated that operations 206-216 can be iterated until the server computer 102 determines, in any iteration of operation 216, that no additional service components 126 remain for configuration and/or preparation for deployment.

If the server computer 102 determines, in operation 216, that no additional service components 126 remain for configuration and/or preparation for deployment, the method 200 can proceed to operation 218. Alternatively, the method 200 can proceed to operation 218 if the server computer 102 determines, in operation 216, that all service components 126 have been configured and prepared for deployment. At any rate, in operation 218, the server computer 102 can trigger deployment of the service components 126 to the infrastructure associated with the computing environments 124. In particular, at operation 218, the server computer 102 can generate commands, packages, images, and the like (if not prepared as part of operation 214) and/or instruct other entities to perform operations for deploying the service components 126 to the computing environments 124. As noted above, the service components 126 can be deployed to one or more computing environment 124 according to various embodiments of the concepts and technologies disclosed herein. way.

From operation 218, the method 200 can proceed to operation 220. The method 200 can end at operation 220.

Figure 3:
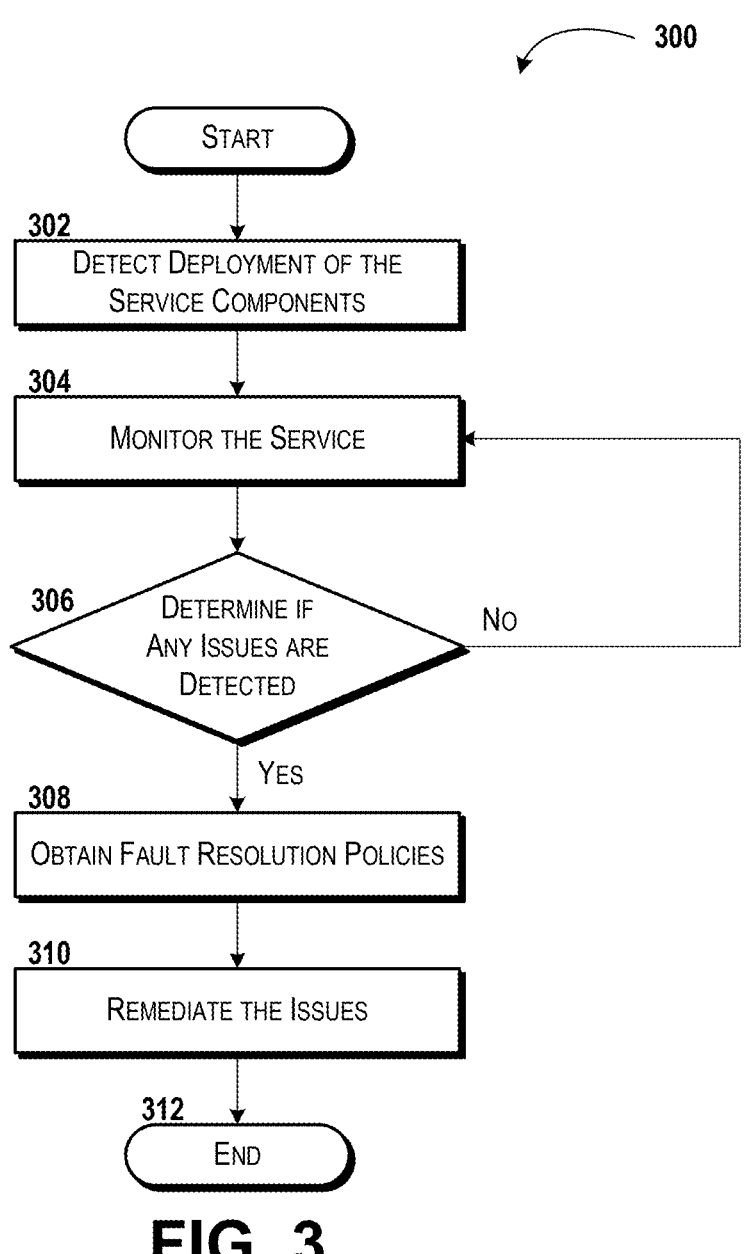
FIG. 3 is a flow diagram showing aspects of a method for monitoring a service and remediating faults using a service creation and deployment orchestrator, according to an illustrative embodiment of the concepts and technologies described herein.

Turning now to FIG. 3, aspects of a method 300 for monitoring a service 128 and remediating faults using a service creation and deployment orchestrator 106 will be described in detail, according to an illustrative embodiment. For purposes of illustrating and describing the concepts of the present disclosure, the method 300 is described herein as being performed by the server computer 102 via execution of one or more software modules such as, for example, the service creation and deployment orchestrator 106. It should be understood that additional and/or alternative devices and/or network nodes can provide the functionality described herein via execution of one or more modules, applications, and/or other software including, but not limited to, the service creation and deployment orchestrator 106. Thus, the illustrated embodiments are illustrative, and should not be viewed as being limiting in any way.

The method 300 begins at operation 302. At operation 302, the server computer 102 can detect deployment of the service components 126. In some embodiments, operation 302 can correspond to the server computer 102 detecting deployment and/or instantiation of the service 128. Because operation 302 can correspond to the server computer 102 determining that the service 128 and/or the service components 126 have been deployed and/or may have been instantiated, it should be understood that the above examples are illustrative and should not be construed as being limiting in any way.

From operation 302, the method 300 can proceed to operation 304. At operation 304, the server computer 102 can monitor the service 128 and/or the service components 126. In particular, the server computer 102 can be configured to monitor the service 128 upon instantiation. In some embodiments, the server computer 102 can initiate monitoring of the service 128 by active monitoring, by receiving data from reporting and/or monitoring mechanisms (e.g., receiving reports 148 from the service 128), and/or otherwise monitoring operations of the service 128.

From operation 304, the method 300 can proceed to operation 306. At operation 306, the server computer 102 can determine, based on the monitoring and/or reports 148, if any issues such as faults, errors, security issues, or the like are detected with respect to the service 128. If the server computer 102 determines that no issues have been detected, the method 300 can return to operation 304 and monitoring can resume (and/or another report 148 can be received). Operations 304-306 can be iterated until the server computer 102 determines, in any iteration of operation 306, that an issue has been detected or until execution of the service 128 and/or service components 126 has ceased or been terminated.

If the server computer 102 detects any issues in operation 306, the method 300 can proceed to operation 308. At operation 308, the server computer 102 can obtain one or more fault resolution policies for resolution of the issue detected in operation 306. In particular, as illustrated and described herein, the service catalog 138 can include fault resolution policies for the services 128 and/or the service components 126. Thus, the server computer 102 can be configured to obtain, in operation 308, one or more fault resolution policies by the server computer 102 querying, triggering a query of, and/or otherwise accessing or triggering access to the service catalog 138. Although not illustrated in FIG. 1A, some embodiments of the concepts and technologies disclosed herein can also include a fault and/or fault resolution log or database, and as such, operation 308 can correspond to the server computer 102 accessing one or more security policy logs and/or other data structures that can be stored at the data store 136, the server computer 102, and/or elsewhere to obtain the fault resolution policies. It should be understood that this example embodiment is illustrative, and therefore should not be construed as being limiting in any way.

From operation 308, the method 300 can proceed to operation 310. At operation 310, the server computer 102 can remediate the issues identified in operation 306 and/or trigger remediation of the issues identified in operation 306. In operation 310, the server computer 102 can perform various operations to remediate the detected issues. For example, the server computer 102 can be configured to modify the service components 126, to modify the infrastructure, to terminate execution of the service 128 and/or the service components 126, and/or modify other aspects of the service components 126 to remediate the faults. Because other operations can be performed to remediate the detected issues, it should be understood that these example embodiments are illustrative, and therefore should not be construed as being limiting in any way.

From operation 310, the method 300 can proceed to operation 312. The method 300 can end at operation 312.

Figure 4:
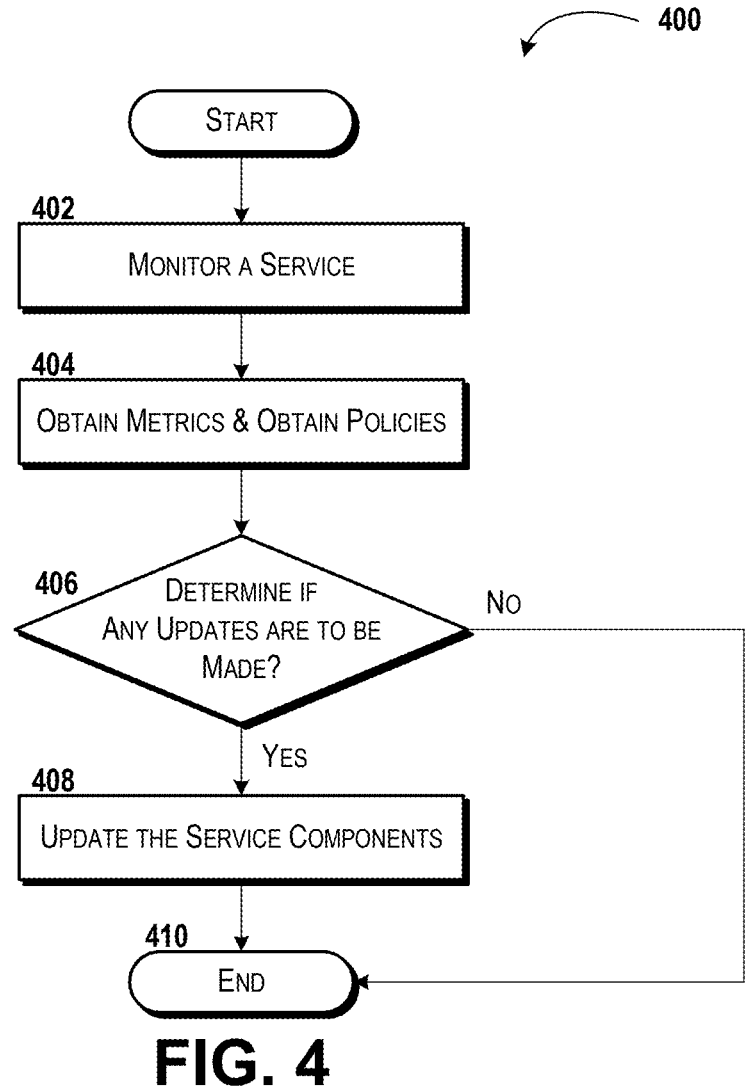
FIG. 4 is a flow diagram showing aspects of a method for monitoring and updating a service based on performance metrics using a service creation and deployment orchestrator, according to an illustrative embodiment of the concepts and technologies described herein.

Turning now to FIG. 4, aspects of a method 400 for monitoring and updating a service 128 based on performance metrics using a service creation and deployment orchestrator 106 will be described in detail, according to an illustrative embodiment. For purposes of illustrating and describing the concepts of the present disclosure, the method 400 is described herein as being performed by the server computer 102 via execution of one or more software modules such as, for example, the service creation and deployment orchestrator 106. It should be understood that additional and/or alternative devices and/or network nodes can provide the functionality described herein via execution of one or more modules, applications, and/or other software including, but not limited to, the service creation and deployment orchestrator 106. Thus, the illustrated embodiments are illustrative, and should not be viewed as being limiting in any way.

The method 400 begins at operation 402. At operation 402, the server computer 102 can monitor a service 128 and/or the service components 126 associated with the service 128. In particular, the server computer 102 can be configured to monitor the service 128 upon instantiation and/or at other times such as, for example, in response to receiving a report 148, on command, at regular and/or irregular time intervals, upon detecting particular events, combinations thereof, or the like. In some embodiments, the server computer 102 can initiate monitoring of the service 128 by active monitoring within the computing environments 124, by receiving data from reporting and/or monitoring mechanisms (e.g., receiving reports 148 from the service 128), and/or otherwise monitoring operations of the service 128. Because monitoring of the service 128 and/or the service components 126 can be accomplished in various manners, it should be understood that these example embodiments are illustrative, and therefore should not be construed as being limiting in any way.

From operation 402, the method 400 can proceed to operation 404. At operation 404, the server computer 102 can obtain metrics associated with the service 128 and/or the service components 126 and obtain one or more policies for the service 128 and/or the service components 126. It can be appreciated that in some embodiments of the method 400, operation 402 can include receiving a report 148, and as such, the server computer 102 may not obtain the metrics in operation 404 (as these may already have been provided in operation 402). At any rate, the server computer 102 can obtain one or more policies, which may identify performance guidelines for the service 128 and/or service components 126 and/or other metrics to be tracked by the server computer 102. It can be appreciated that the server computer 102 can obtain the policies for the service 128 and/or service components 126 in operation 404 by accessing the service catalog 138 and/or other data storage locations to obtain the policies. Because the metrics and/or the policies can be obtained in additional and/or alternative manners, it should be understood that these example embodiments are illustrative, and therefore should not be construed as being limiting in any way.

From operation 404, the method 400 can proceed to operation 406. At operation 406, the server computer 102 can determine, based on the monitoring and/or reports 148, if any updates are to be made to the service 128 and/or the service components 126. In particular, operation 406 can correspond to the server computer 102 determining if performance of the service 128 is in need of improvement, fails to meet expectations, or the like. Operation 406 can correspond to the server computer 102 determining, for example, that capacity of the service 128 or service components 126 should be increased or decreased, that service components 126 should be removed or added, that networking resources should be changed, combinations thereof, or the like. Thus, operation 406 can correspond to the server computer 102 determining that some change should be made to the service 128 and/or the service components 126. It should be understood that this example embodiment is illustrative, and therefore should not be construed as being limiting in any way.

If the server computer 102 determines, in operation 406, that some update should be made to the service 128 and/or the service component 126, the method 400 can proceed to operation 408. At operation 408, the server computer 102 create new versions of the service components 126, modify one or more of the existing service components 126, modify the existing infrastructure, deploy or trigger deployment of new infrastructure and/or infrastructure assignments, terminate execution of the service 128 and/or the service components 126, and/or otherwise update or modify other aspects of the service components 126 and/or the service 128 to improve performance of the service 128. Because other operations can be performed to improve performance of the service 128, it should be understood that these example embodiments are illustrative, and therefore should not be construed as being limiting in any way.

From operation 408, the method 400 can proceed to operation 410. The method 400 also can proceed to operation 410 if the server computer 102 determines, in operation 406, that no updates are to be made to the service 128 and/or the service components 126. The method 400 can end at operation 410.

Figure 5A:
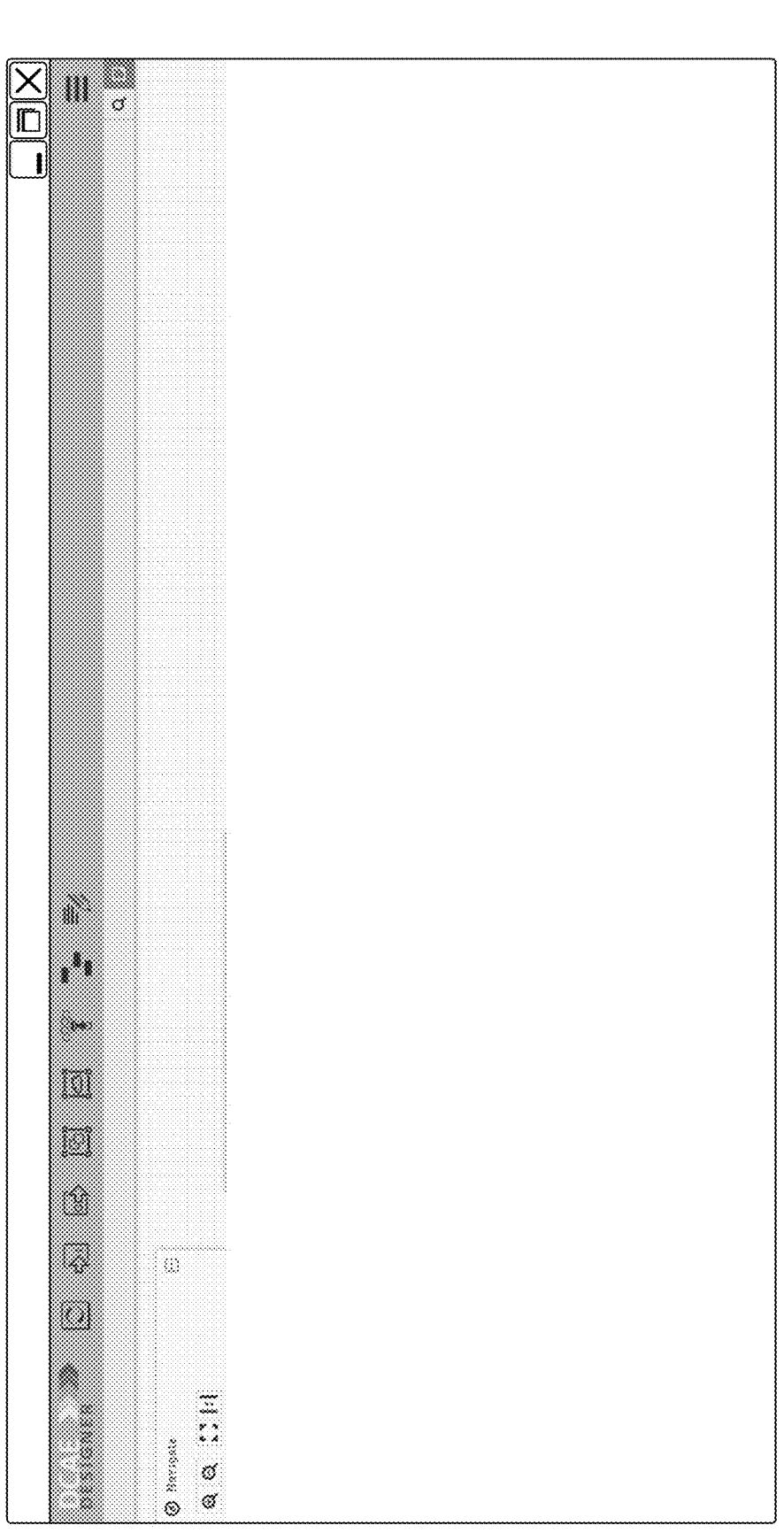
FIGS. 5A-5V are user interface diagrams showing various screen displays for interacting with a creation and deployment service, according to some illustrative embodiments of the concepts and technologies described herein.
Figure 5B:
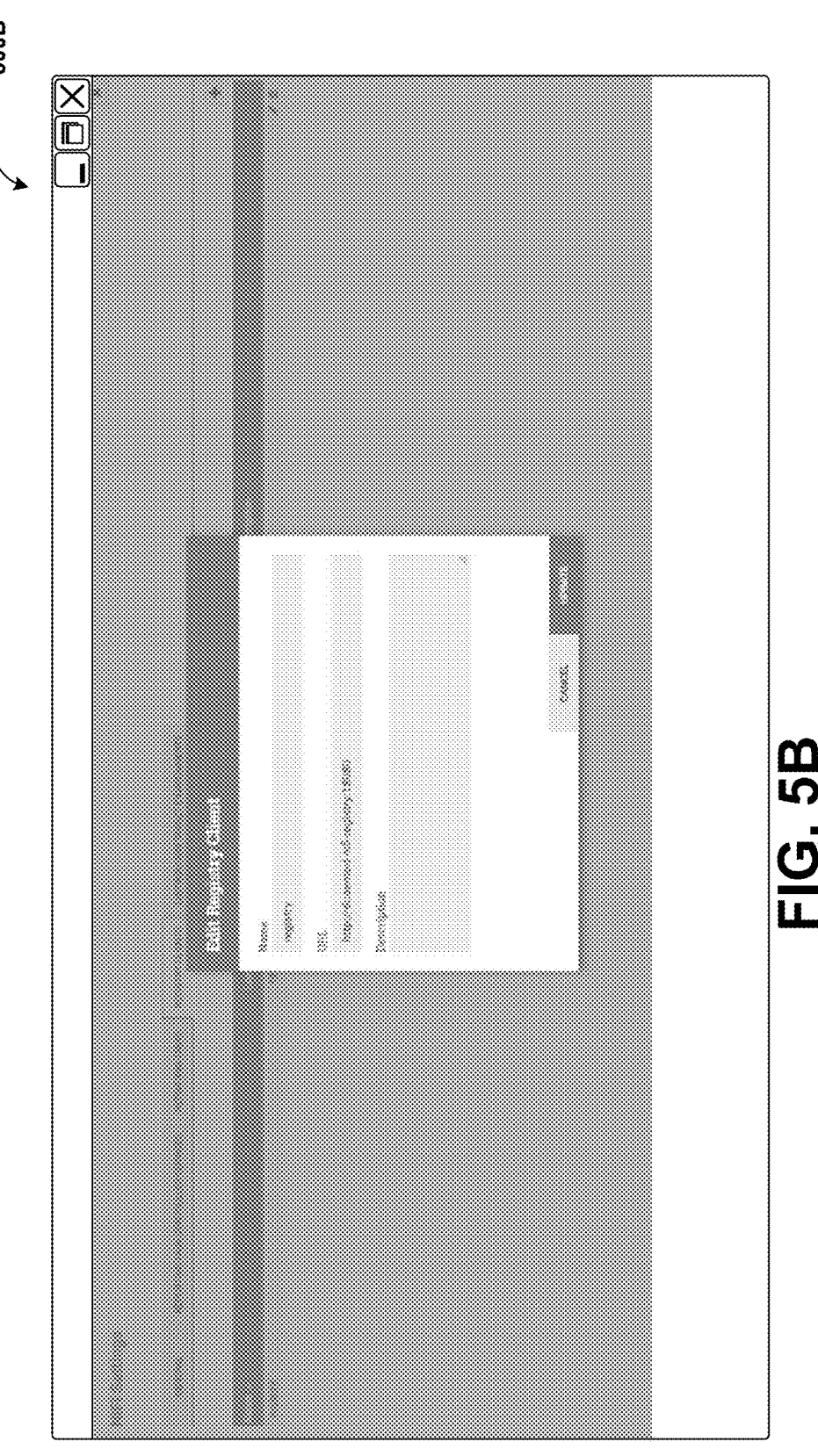

FIGS. 5A-5H are user interface ("UI") diagrams showing aspects of UIs for interacting with the data collection analytics and events microservice onboarding and design module 132 illustrated and described herein. FIG. 5A shows an illustrative screen display 500A. The screen display 500A shows an example user interface for use in onboarding developed microservices or components, which can include spec files in the .json format, for example. This onboarding can be completed by making requests to the onboarding application programming interface or using a graphical user interface. For onboarding, the microservices developer can access the Nifi user interface, as shown in FIG. 5B. Because the screen displays 500A, 500B illustrated in FIGS. 5A-5B can be displayed at additional and/or alternative times, and because the screen display 500A can include additional and/or alternative elements, it should be understood that the illustrated example embodiment is illustrative and therefore should not be construed as being limiting in any way.

Figure 5C:
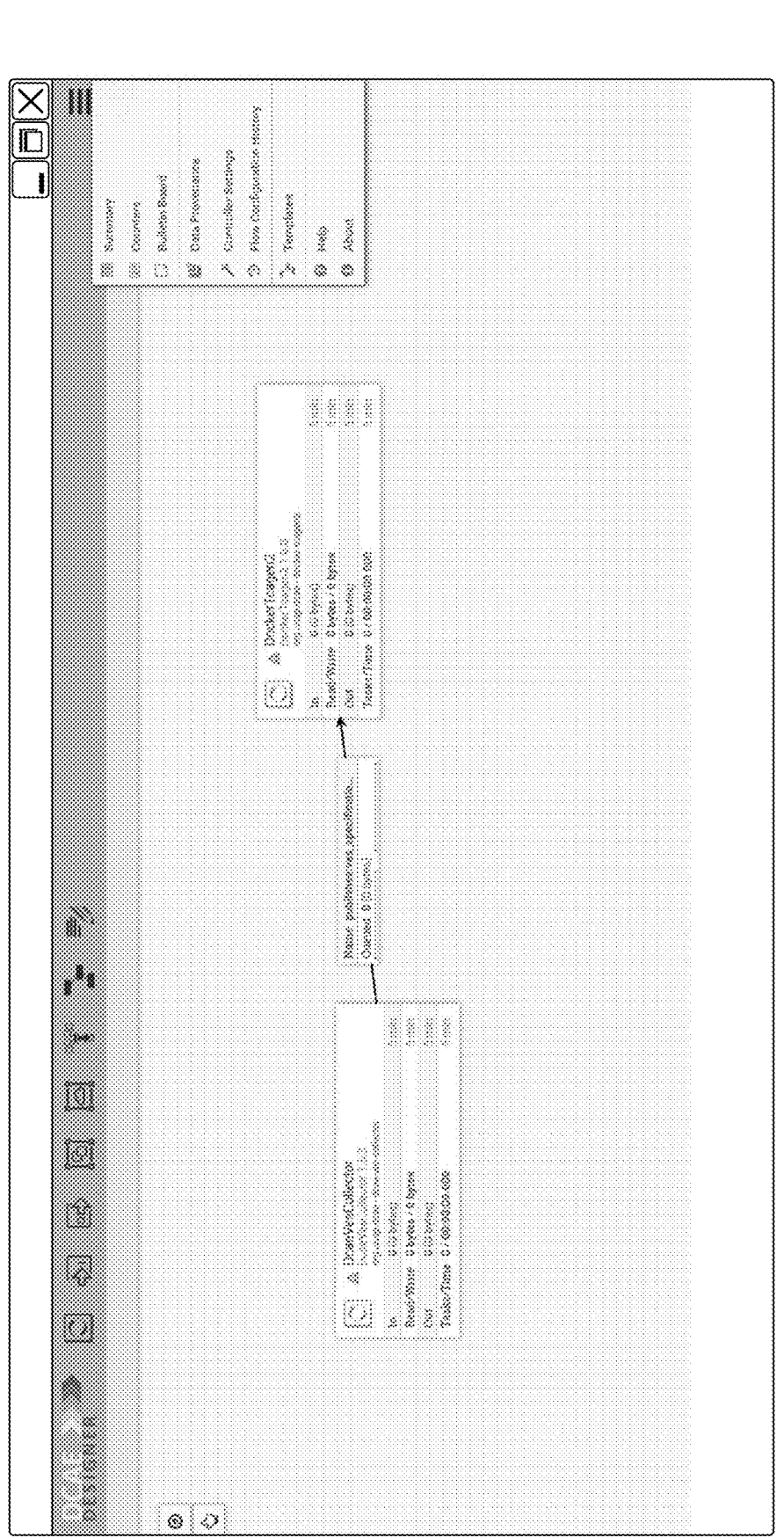
Figure 5D:
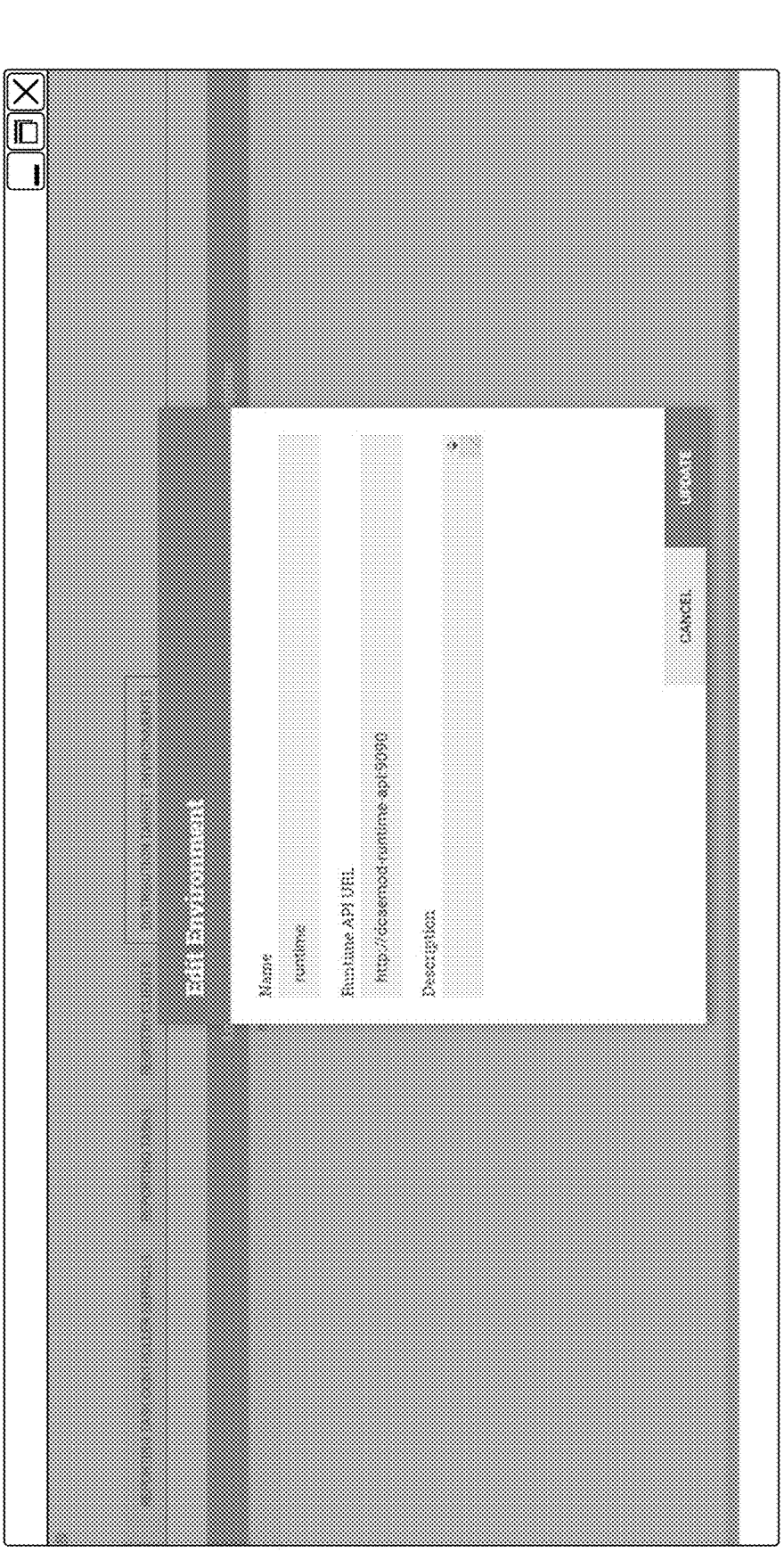

FIGS. 5C and 5D show illustrative screen displays 500C and 500D for setting a distribution target in the controller settings of the data collection analytics and events microservice onboarding and design module 132. Because the screen displays 500C and 500D illustrated in FIGS. 5C and 5D can be displayed at additional and/or alternative times, and because the screen displays 500C and 500D can include additional and/or alternative elements, it should be understood that the illustrated example embodiment is illustrative and therefore should not be construed as being limiting in any way.

Figure 5E:
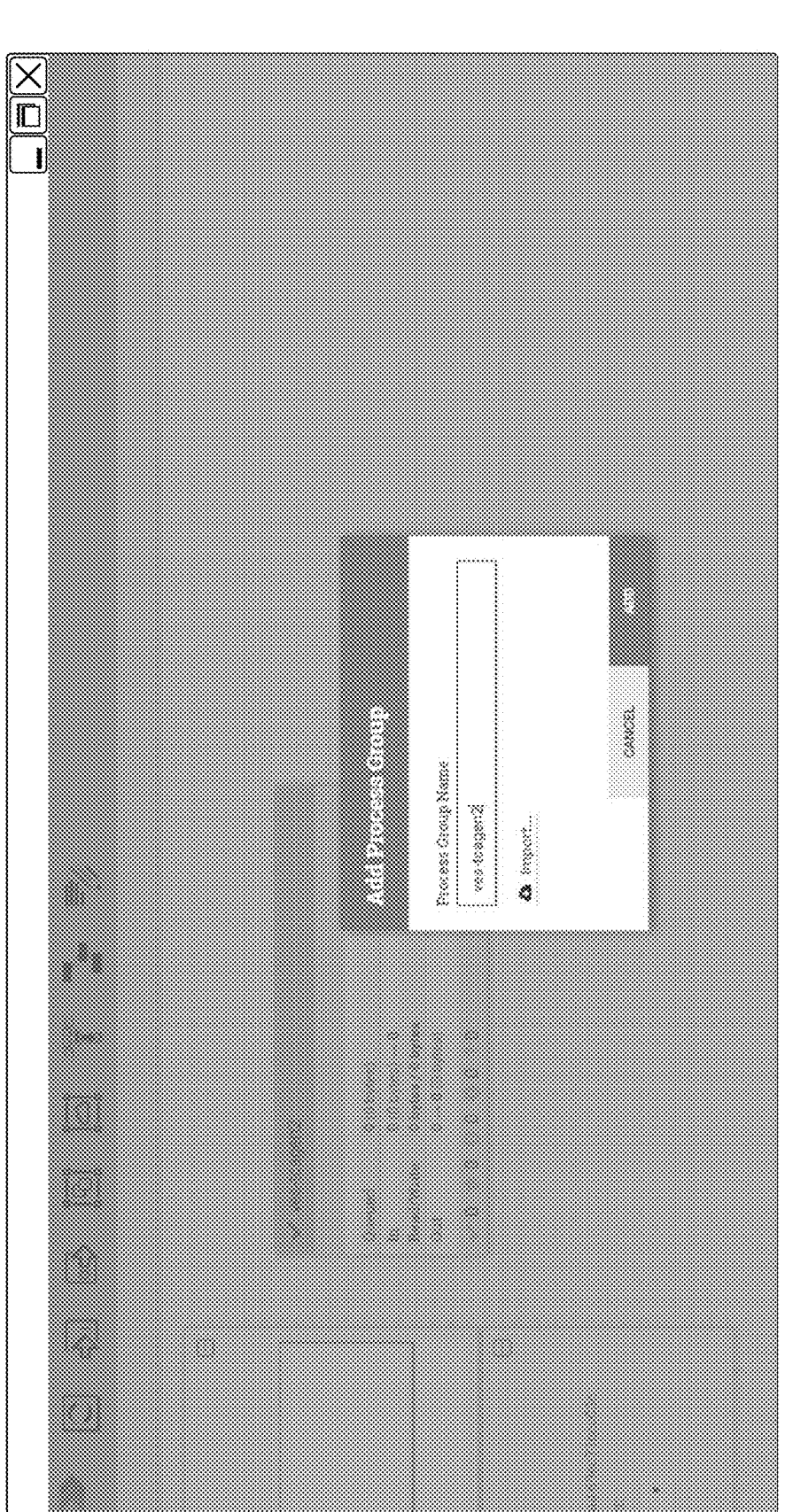

FIG. 5E shows an illustrative screen display 500E. As shown in FIG. 5E, a process group can be created. Because the screen display 500E illustrated in FIG. 5E can be displayed at additional and/or alternative times, and because the screen display 500E can include additional and/or alternative elements, it should be understood that the illustrated example embodiment is illustrative and therefore should not be construed as being limiting in any way.

Figure 5F:
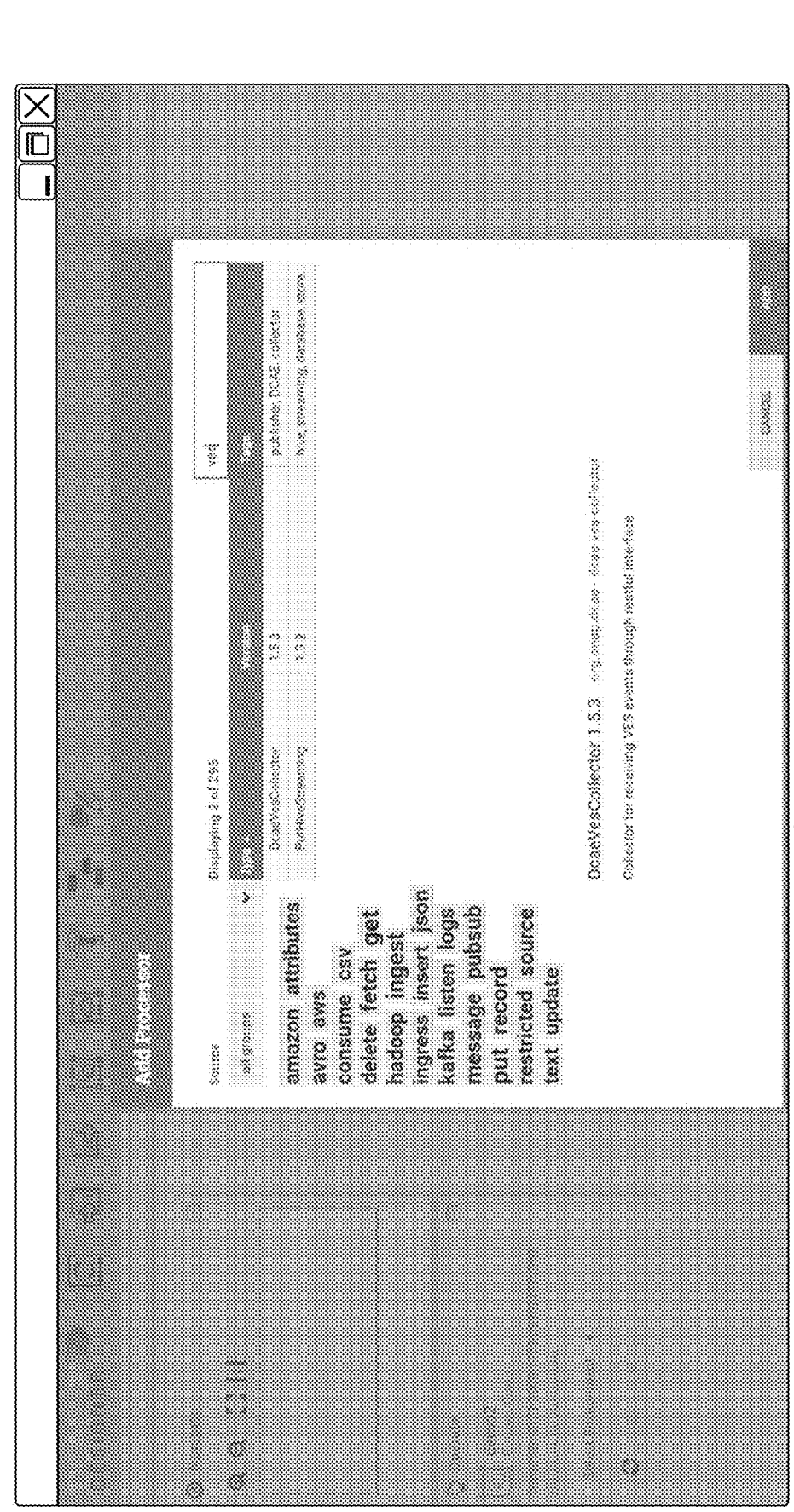

FIG. 5F shows an illustrative screen display 500F. As shown in FIG. 5F, the screen display 500F can be used to search for and select a Nifi processor. Because the screen display 500F illustrated in FIG. 5F can be displayed at additional and/or alternative times, and because the screen display 500F can include additional and/or alternative elements, it should be understood that the illustrated example embodiment is illustrative and therefore should not be construed as being limiting in any way.

Figure 5G:
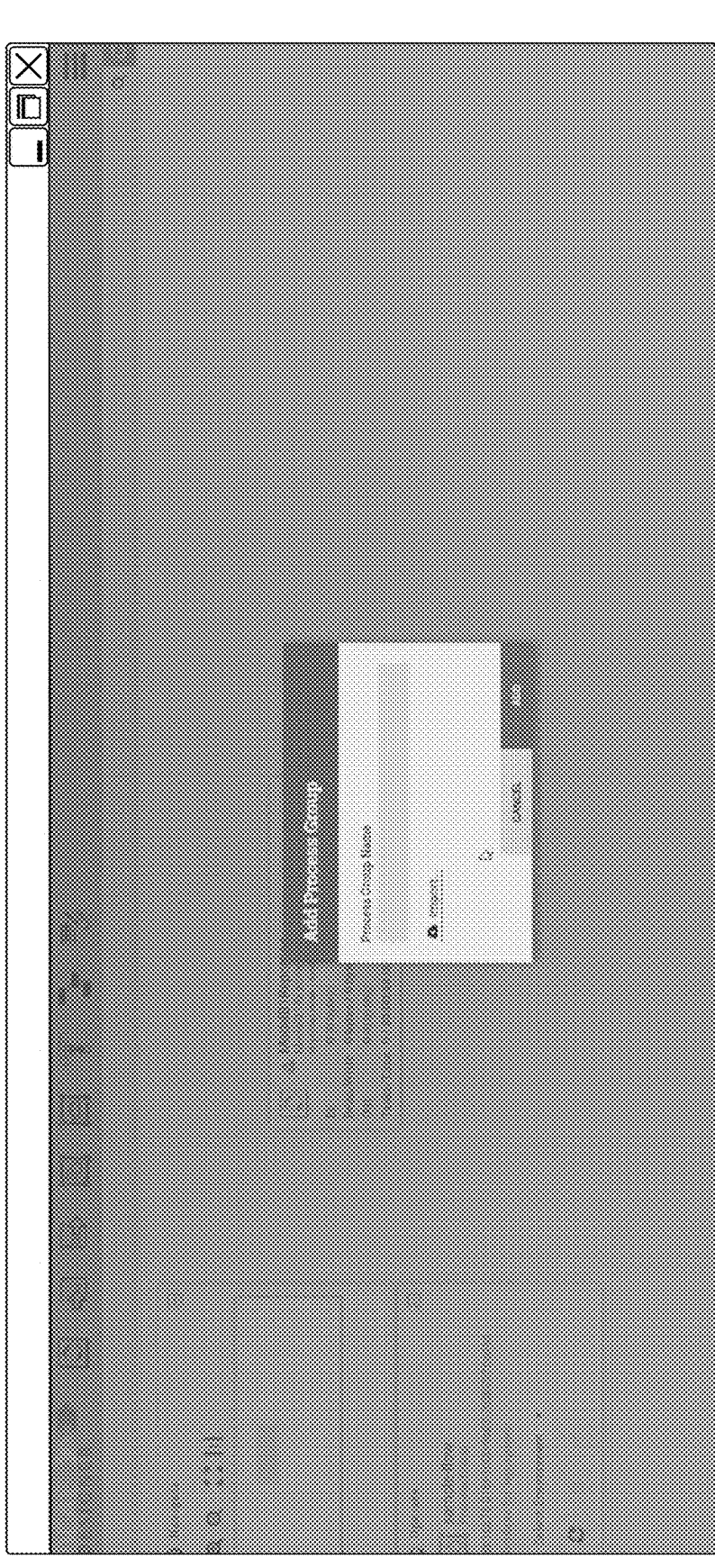

FIG. 5G shows an illustrative screen display 500G. As shown in FIG. 5G, the screen display 500G can be used to import a processor or process group to the Nifi canvas if the Nifi registry linking was successful. Because the screen display 500G illustrated in FIG. 5G can be displayed at additional and/or alternative times, and because the screen display 500G can include additional and/or alternative elements, it should be understood that the illustrated example embodiment is illustrative and therefore should not be construed as being limiting in any way.

Figure 5H:
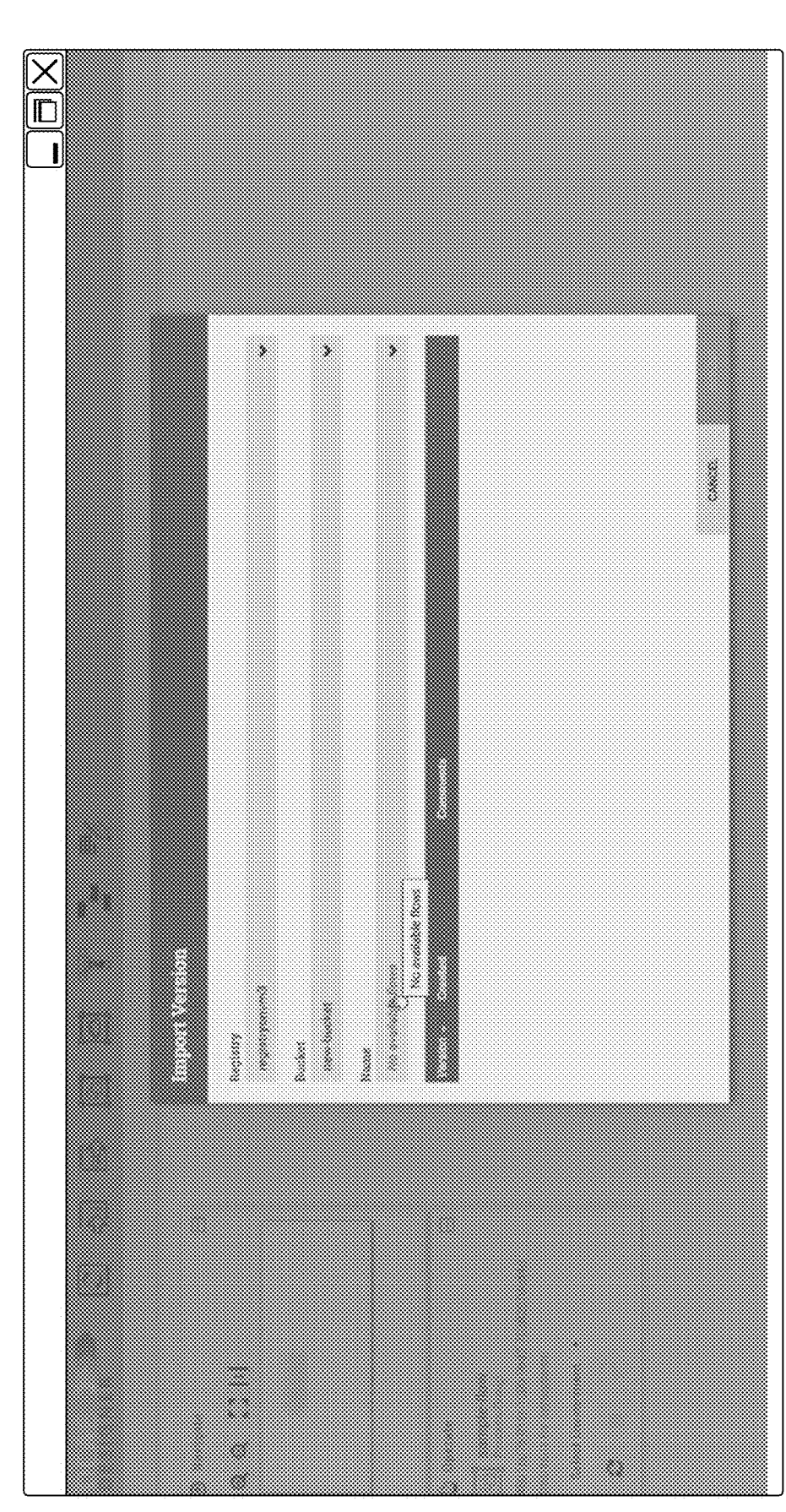

FIG. 5H shows an illustrative screen display 500H. As shown in FIG. 5H, the screen display 500H can be used to import a processor or process group to the Nifi canvas (e.g., after selecting import in the screen display 500G), thereby importing already created, saved, and version-controlled flows from the Nifi registry (if present). Because the screen display 500H illustrated in FIG. 5H can be displayed at additional and/or alternative times, and because the screen display 500H can include additional and/or alternative elements, it should be understood that the illustrated example embodiment is illustrative and therefore should not be construed as being limiting in any way.

Figure 5I:
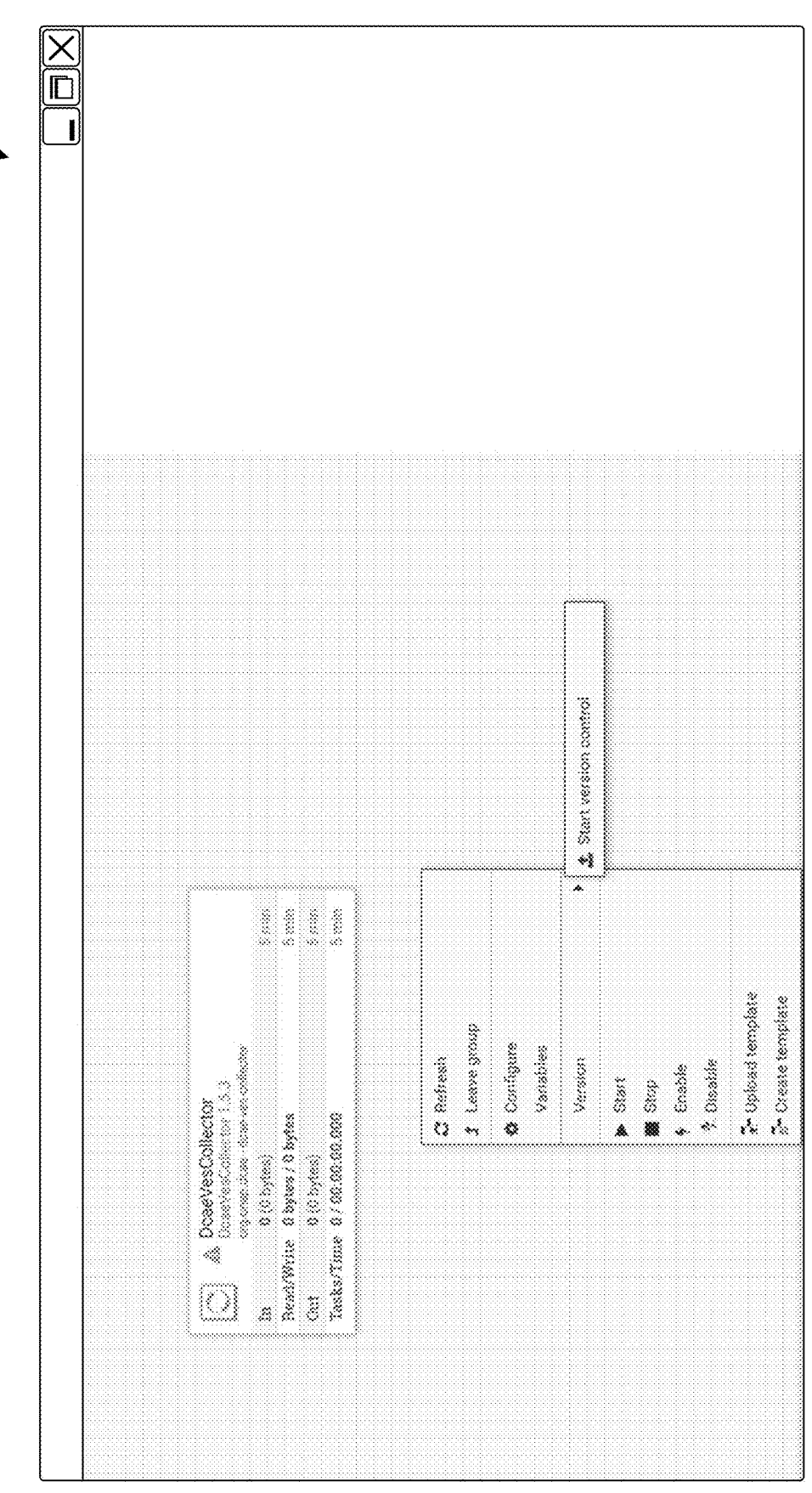

FIG. 5I shows an illustrative screen display 500I. As shown in FIG. 5I, the screen display 500I can be used to activate version controlling, thereby enabling saving created flows by version. Because the screen display 500I can include additional and/or alternative elements, it should be understood that the illustrated example embodiment is illustrative and therefore should not be construed as being limiting in any way.

Figure 5J:

FIG. 5J shows an illustrative screen display 500J. As shown in FIG. 5J, the screen display 500J can be used to name a flow and process group (e.g., for a version that is being saved). Because the screen display 500J illustrated in FIG. 5J can be displayed at additional and/or alternative times, and because the screen display 500J can include additional and/or alternative elements, it should be understood that the illustrated example embodiment is illustrative and therefore should not be construed as being limiting in any way.

Figure 5K:
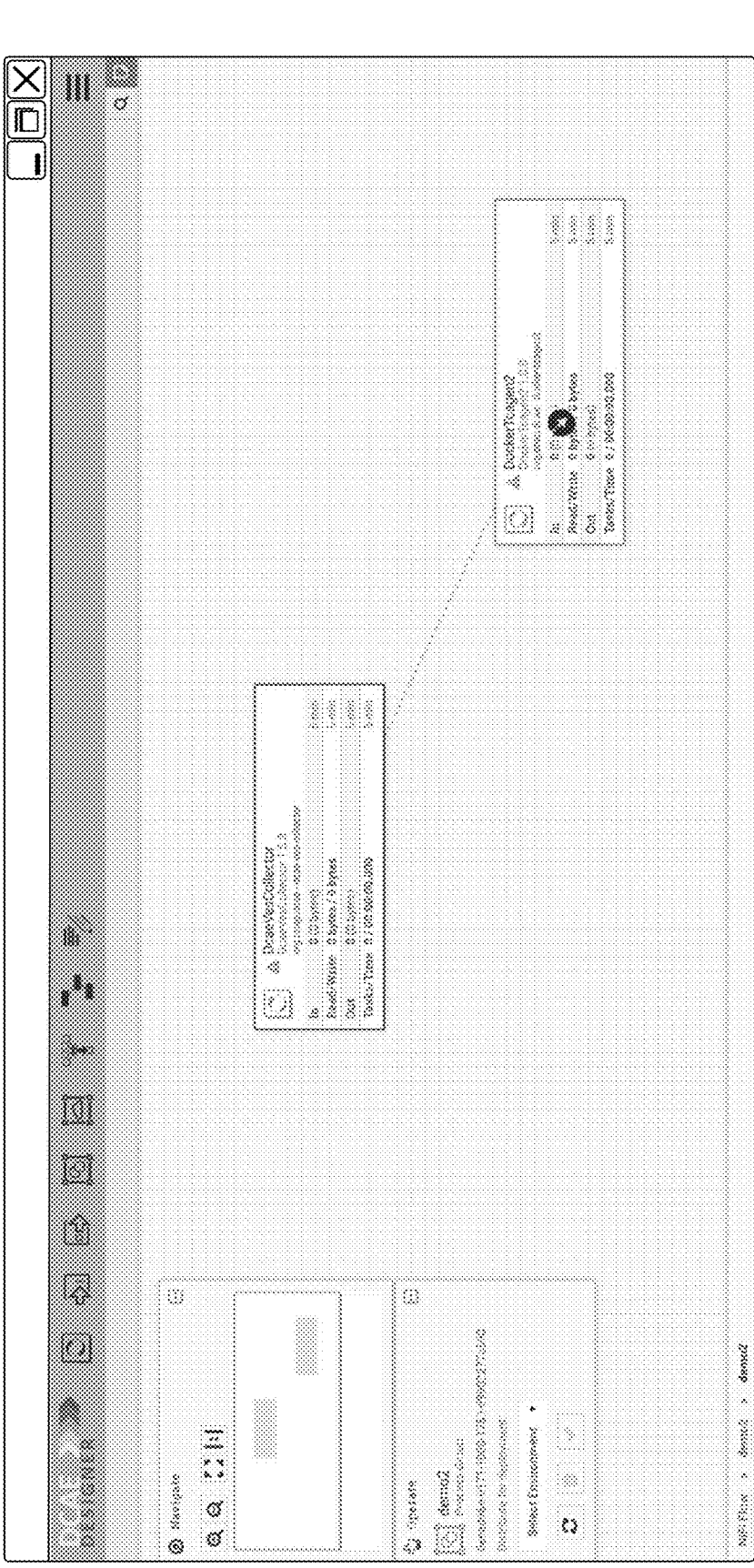
Figure 5L:

FIGS. 5K and 5L show illustrative screen displays 500K and 500L. As shown in FIGS. 5K and 5L, the screen displays 500K and 500L can be used to add components (e.g., service components 126) in a flow and connect the components after setting various data relationships between the components. Because the screen displays 500K and 500L illustrated in FIGS. 5K and 5L can be displayed at additional and/or alternative times, and because the screen display 500K and 500L can include additional and/or alternative elements, it should be understood that the illustrated example embodiment is illustrative and therefore should not be construed as being limiting in any way.

Figure 5M:
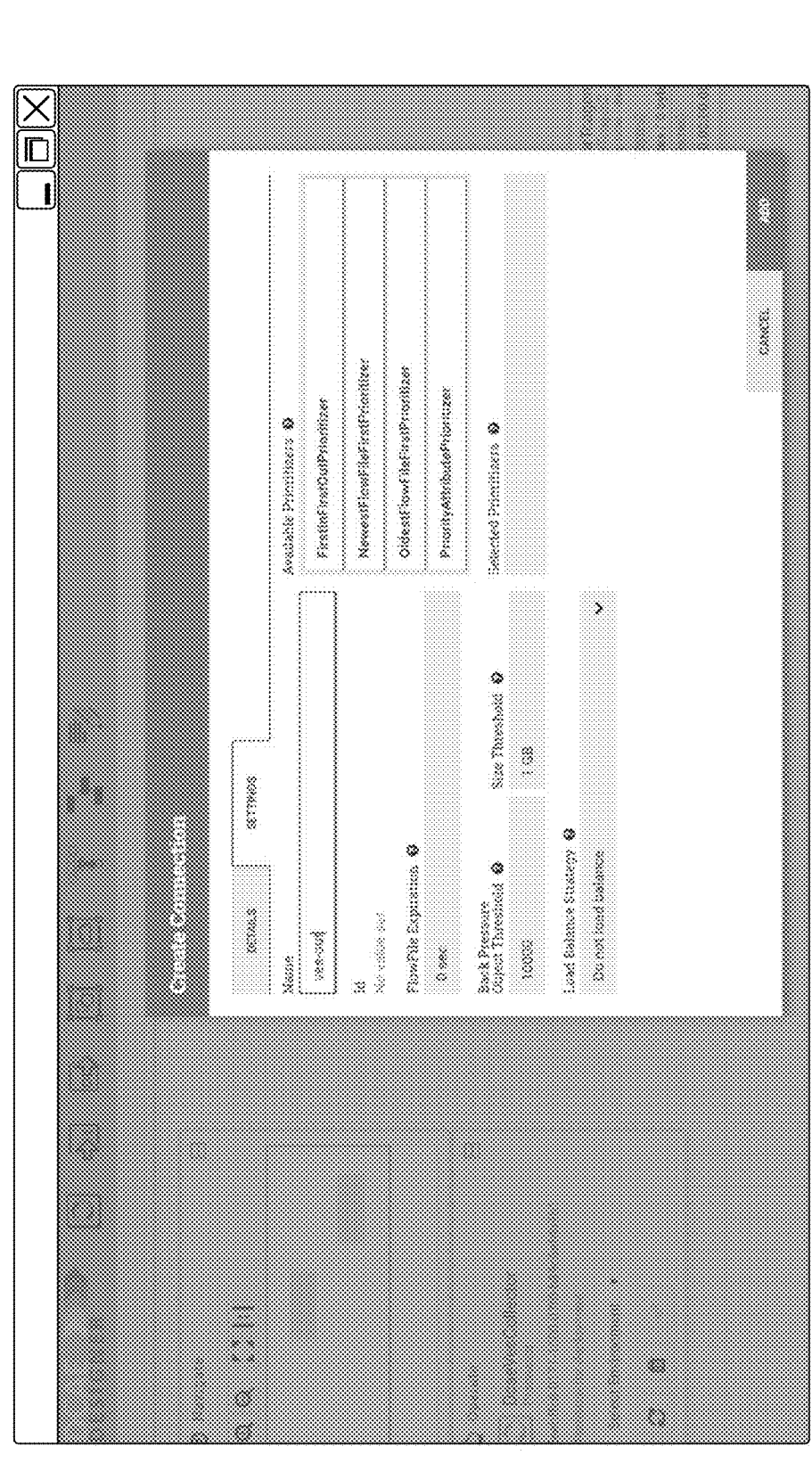

FIG. 5M shows an illustrative screen display 500M. As shown in FIG. 5M, the screen display 500M can be used to provide topic names in a settings section. Because the screen display 500M illustrated in FIG. 5M can be displayed at additional and/or alternative times, and because the screen display 500M can include additional and/or alternative elements, it should be understood that the illustrated example embodiment is illustrative and therefore should not be construed as being limiting in any way.

Figure 5N:
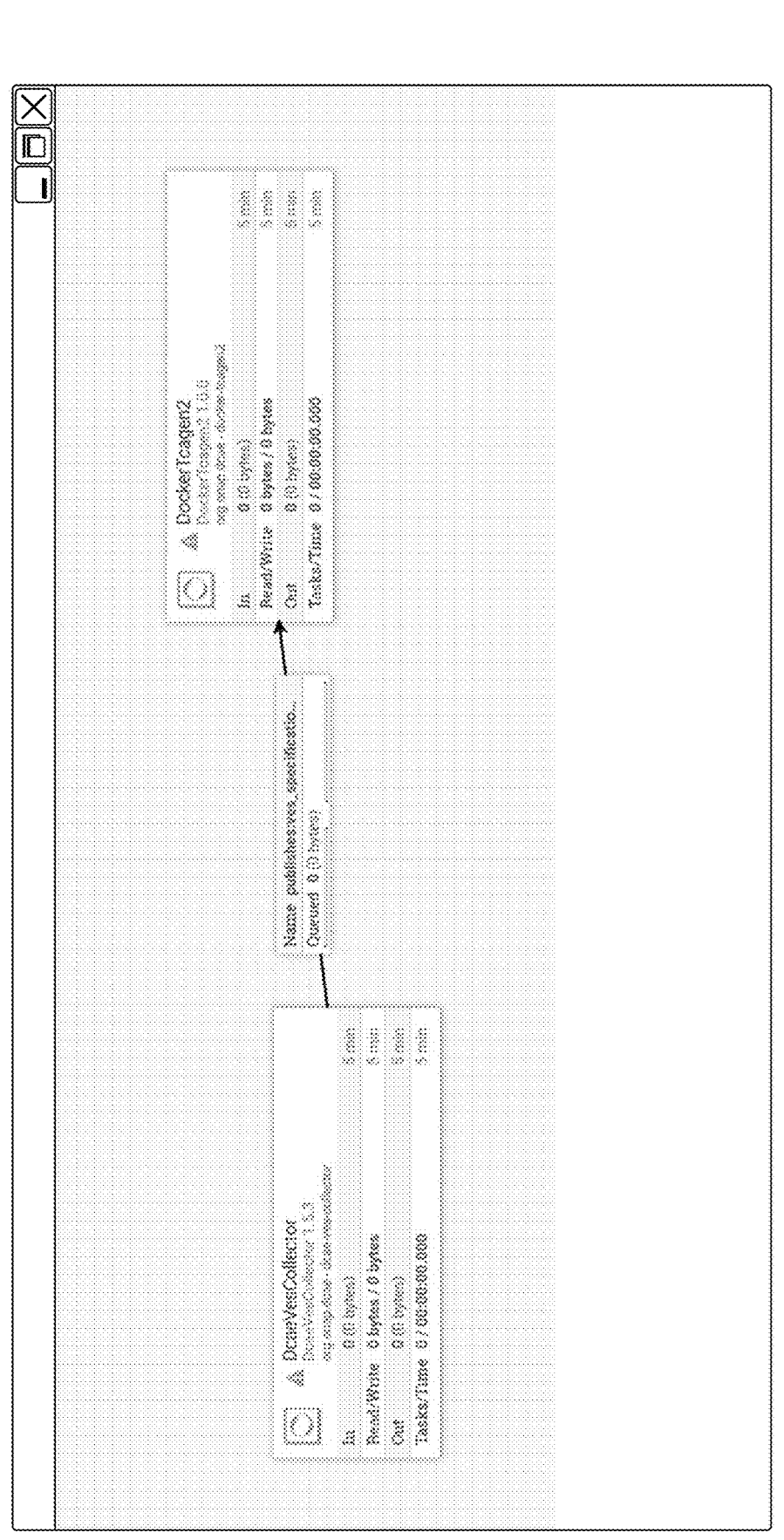

FIG. 5N shows an illustrative screen display 500N. As shown in FIG. 5N, the screen display 500N can display a completed example flow. Although not visible in FIG. 5N, the completed example flow can be distributed, if desired, to one or more recipients, installed in an appropriate runtime environment or the computing environments 124, and/or stored in the service catalog 138. Because the screen display 500N illustrated in FIG. 5N can be displayed at additional and/or alternative times, and because the screen display 500N can include additional and/or alternative elements, it should be understood that the illustrated example embodiment is illustrative and therefore should not be construed as being limiting in any way.

Figure 5O:
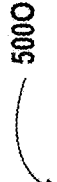

FIG. 5O shows an illustrative screen display 500O. As shown in FIG. 5O, the screen display 500O can be used to inform a user or other entity that the example flow (e.g., the example flow shown in FIG. 5N) was successfully submitted to a runtime environment or other destination as designated. Because the screen display 500O illustrated in FIG. 5O can be displayed at additional and/or alternative times, and because the screen display 500O can include additional and/or alternative elements, it should be understood that the illustrated example embodiment is illustrative and therefore should not be construed as being limiting in any way.

Figure 5P:
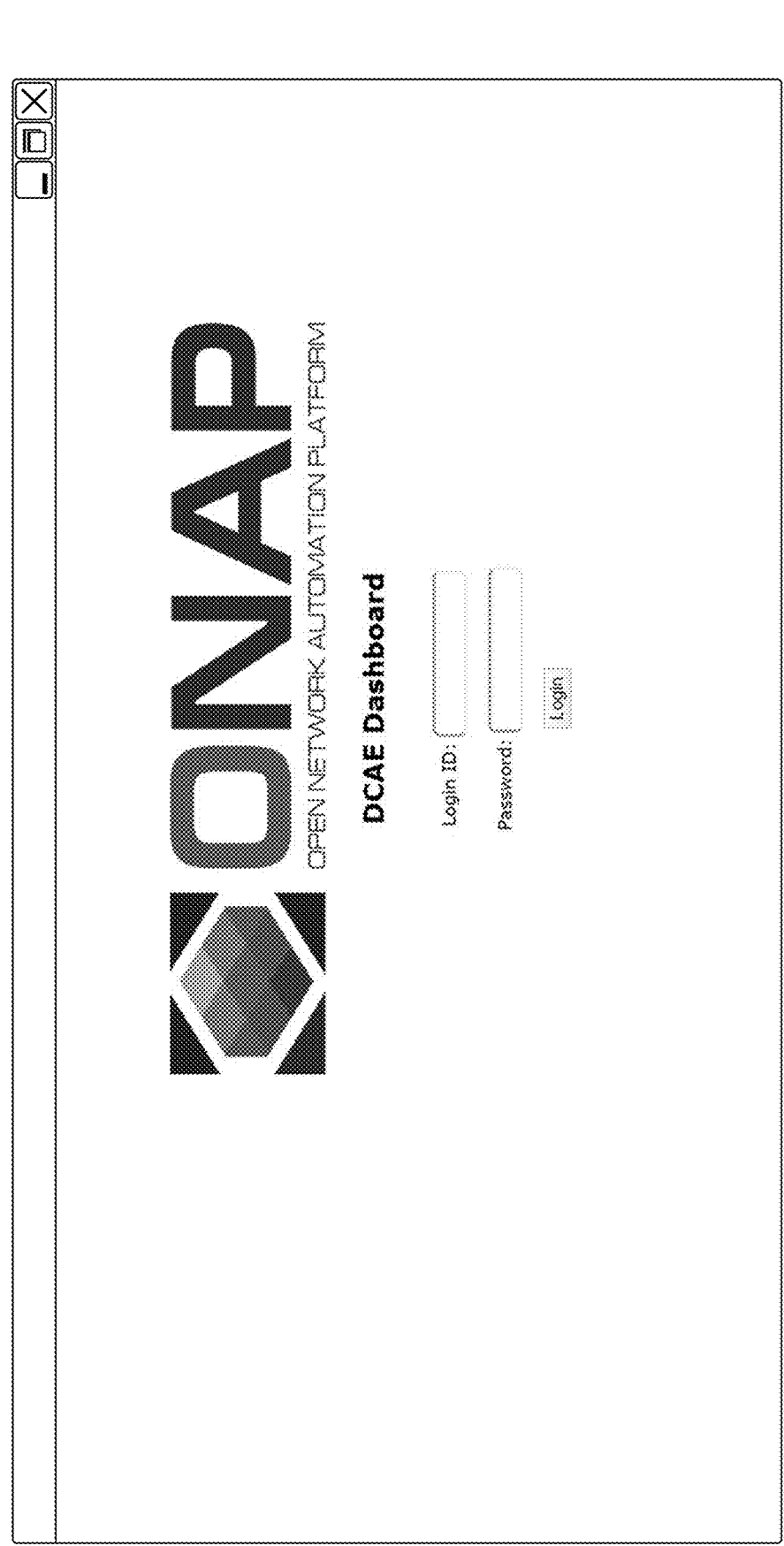

FIG. 5P shows an illustrative screen display 500P. As shown in FIG. 5P, the screen display 500P can be used to present a dashboard (e.g., a login screen) for the data collection analytics and events microservice onboarding and design module 132. Because the screen display 500P illustrated in FIG. 5P can include additional and/or alternative elements, it should be understood that the illustrated example embodiment is illustrative and therefore should not be construed as being limiting in any way.

Figure 5Q:
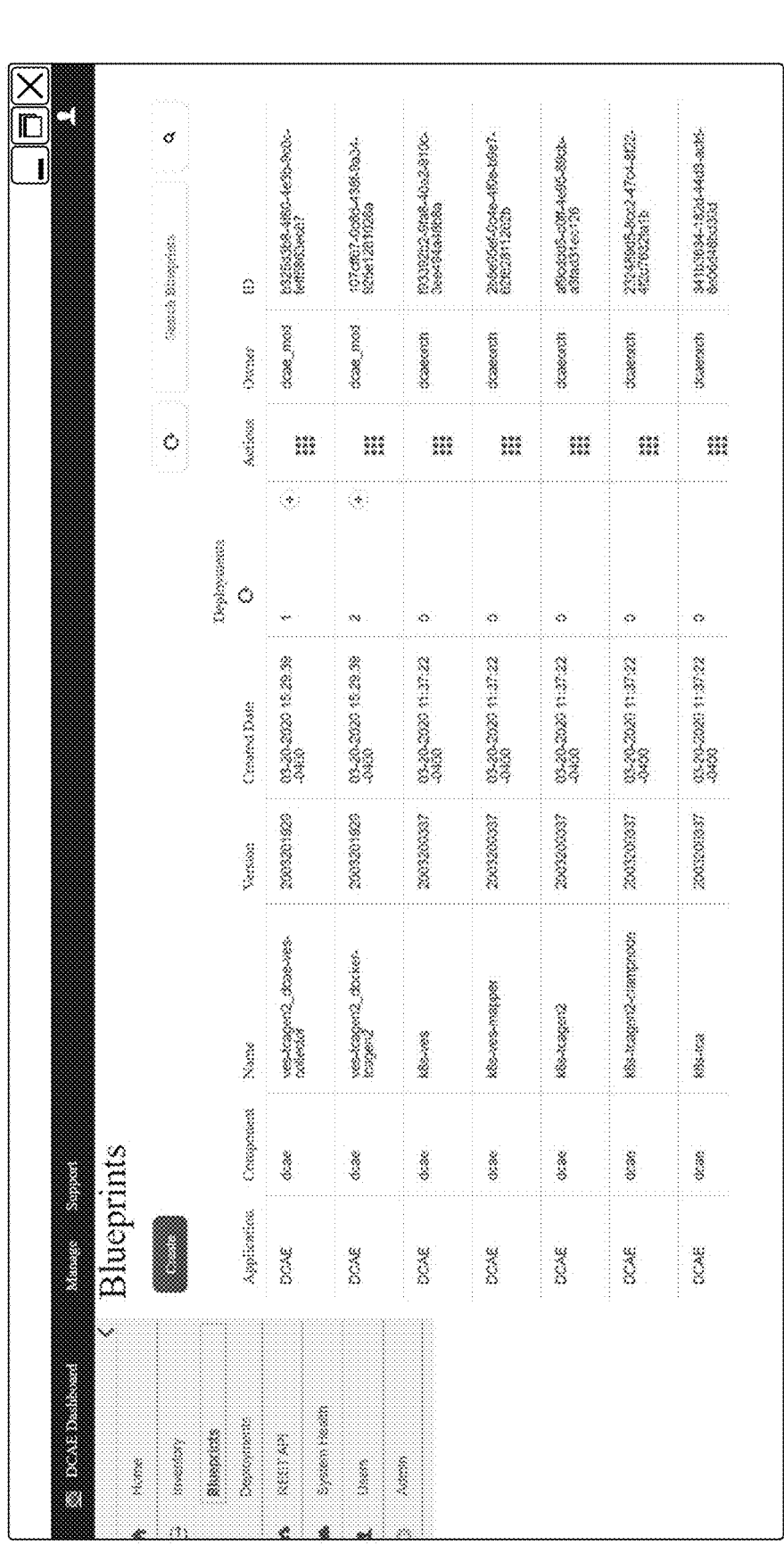

FIG. 5Q shows an illustrative screen display 500Q. As shown in FIG. 5Q, the screen display 500Q can be used to present a dashboard, which can include visual representation of blueprints from an inventory of the data collection analytics and events microservice onboarding and design module 132 (e.g., included in the service catalog 138). According to various embodiments of the concepts and technologies disclosed herein, the blueprints shown in FIG. 5Q can be viewed and optionally deployed from the dashboard. Because the screen display 500Q illustrated in FIG. 5Q can include additional and/or alternative elements, it should be understood that the illustrated example embodiment is illustrative and therefore should not be construed as being limiting in any way.

Figure 5R:
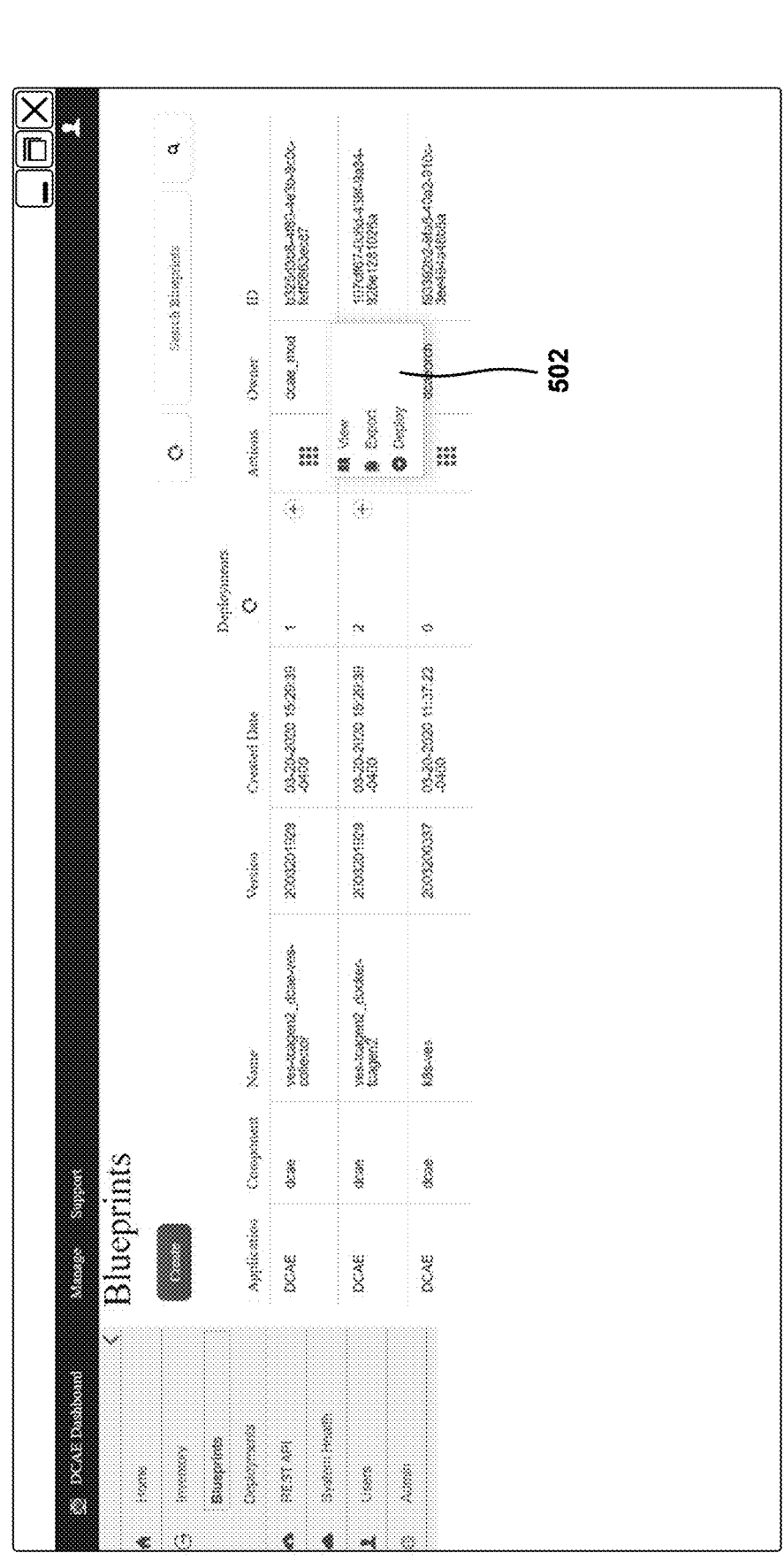

FIG. 5R shows an illustrative screen display 500R. As shown in FIG. 5R, one of the blueprints has been selected and a menu 502 for viewing, exporting, or deploying the blueprint is displayed. Because the screen display 500R illustrated in FIG. 5R can include additional and/or alternative elements, it should be understood that the illustrated example embodiment is illustrative and therefore should not be construed as being limiting in any way.

Figure 5S:
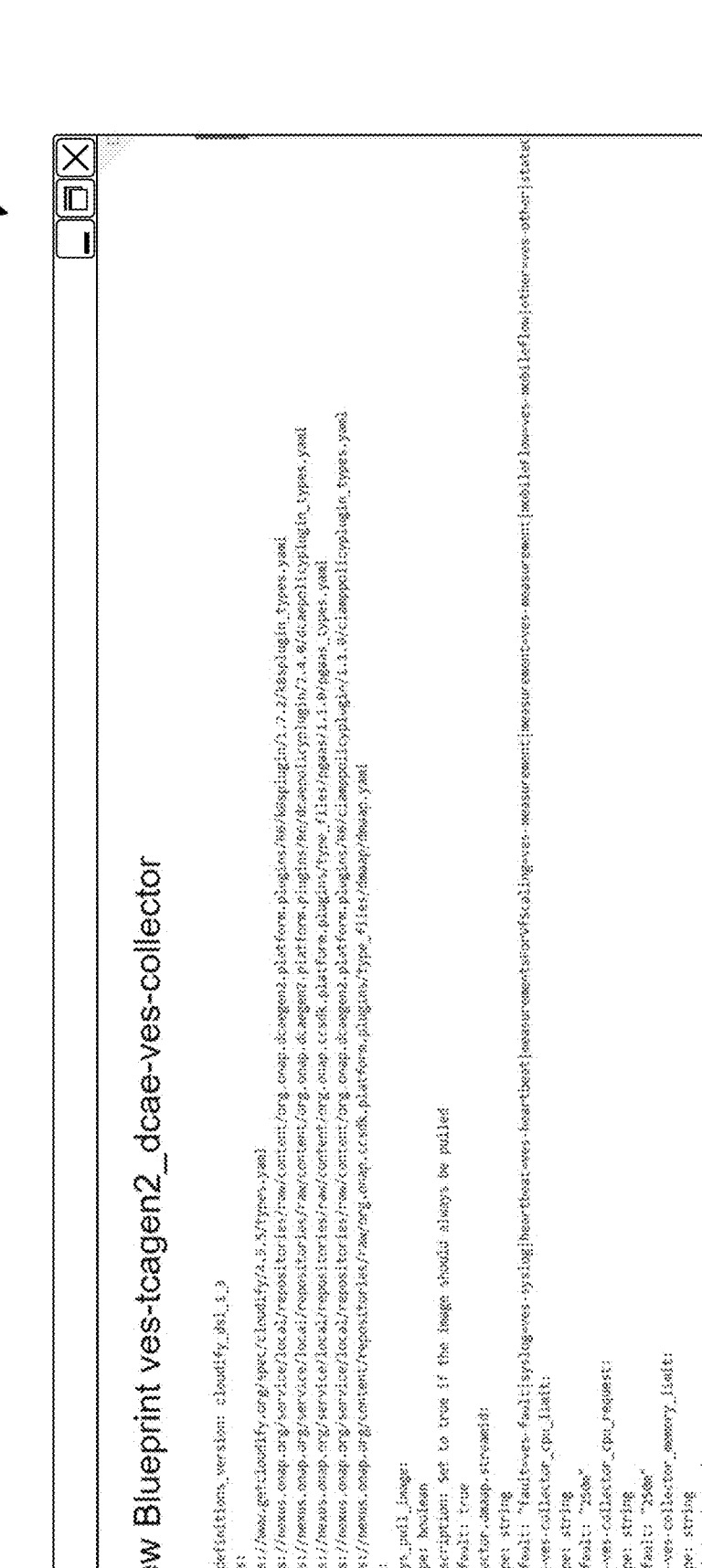

FIG. 5S shows an illustrative screen display 500S. As shown in FIG. 5S, the screen display 500S can be used to view a blueprint from the dashboard. Because the screen display 500S illustrated in FIG. 5S can include additional and/or alternative elements, it should be understood that the illustrated example embodiment is illustrative and therefore should not be construed as being limiting in any way.

Figure 5T:
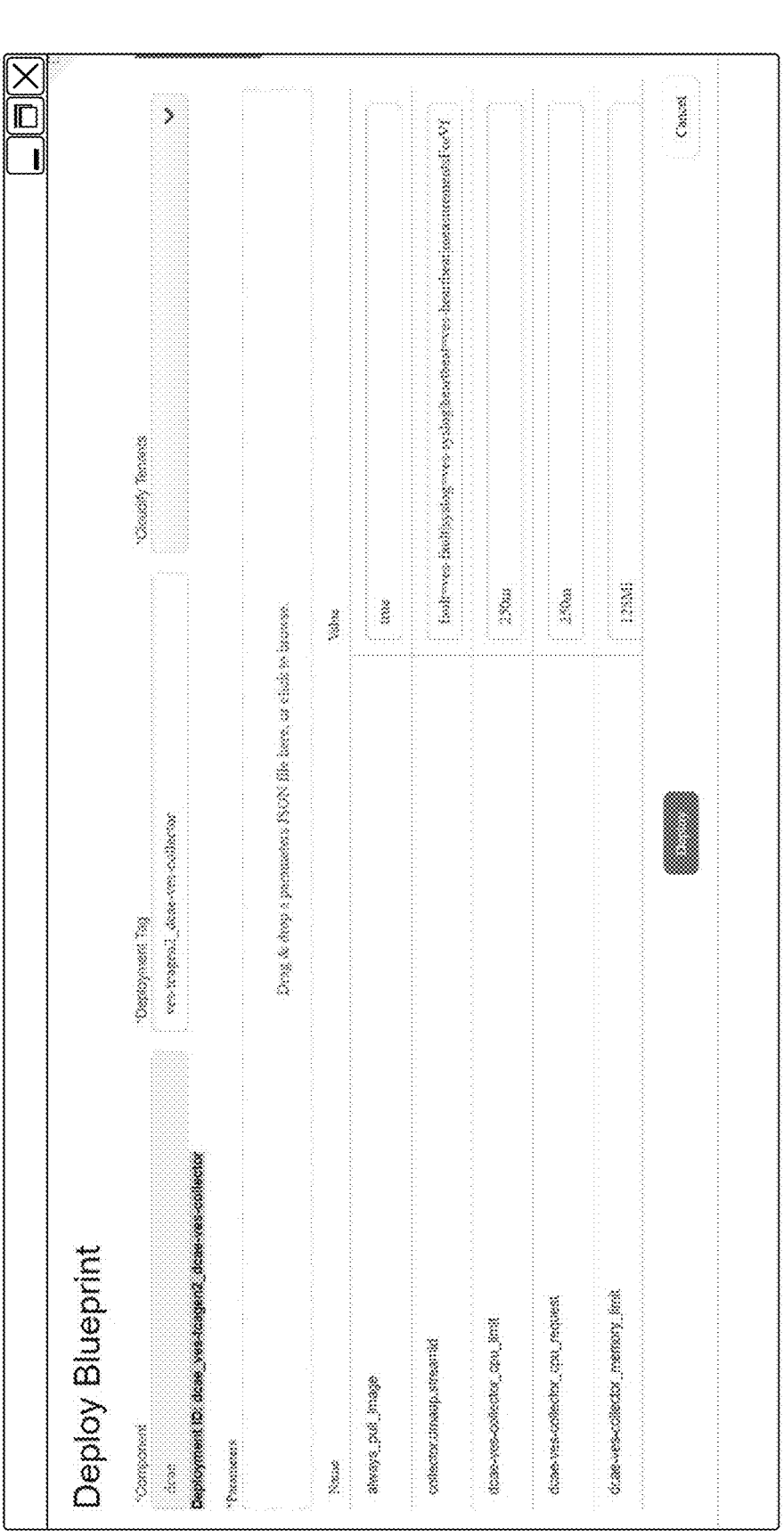

FIG. 5T shows an illustrative screen display 500T. As shown in FIG. 5T, the screen display 500T can be used to deploy a blueprint from the dashboard, with various options being provided to deploy the blueprint. Because the screen display 500T illustrated in FIG. 5T can include additional and/or alternative elements, it should be understood that the illustrated example embodiment is illustrative and therefore should not be construed as being limiting in any way.

Figure 5U:
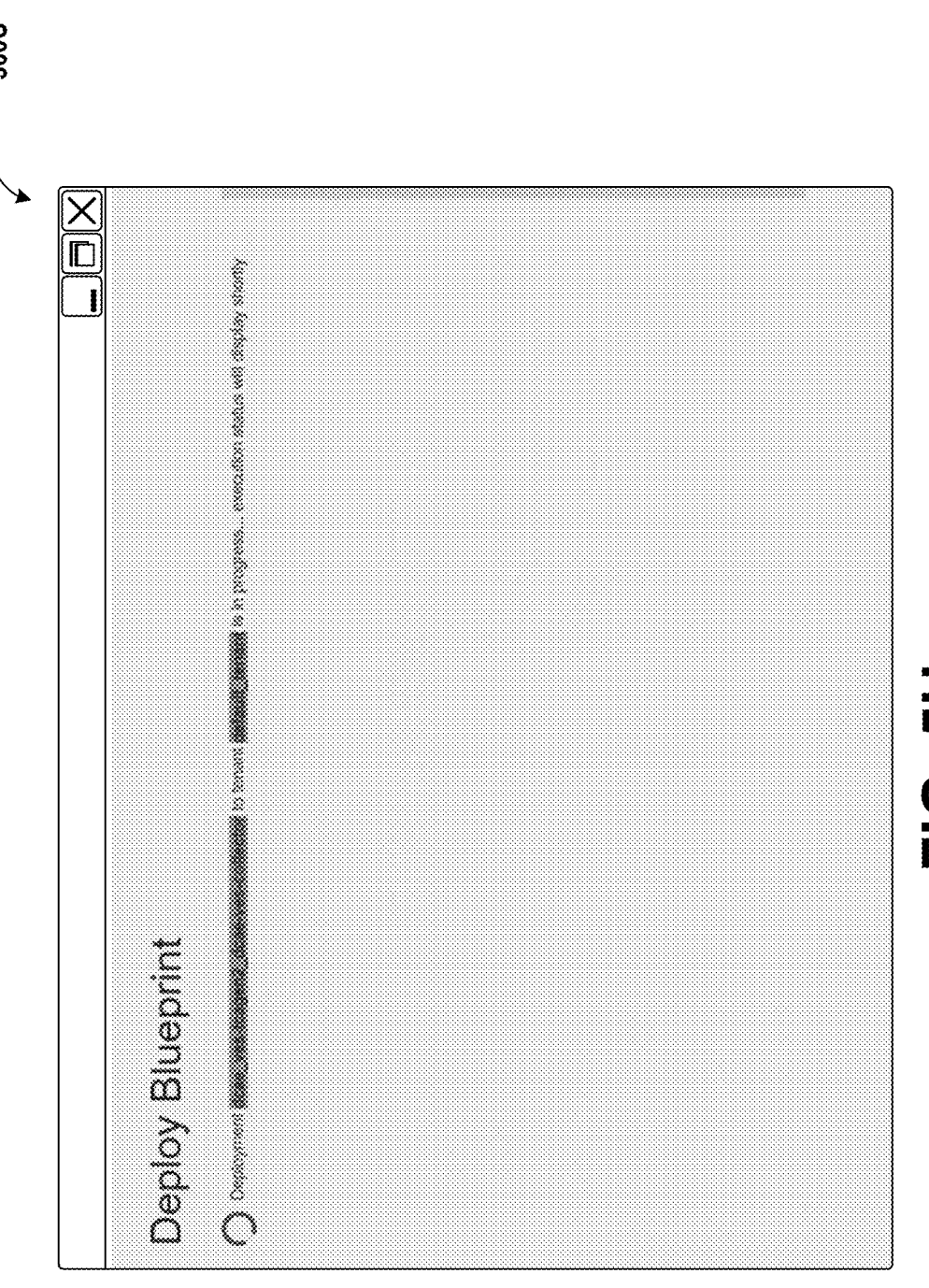
Figure 5V:
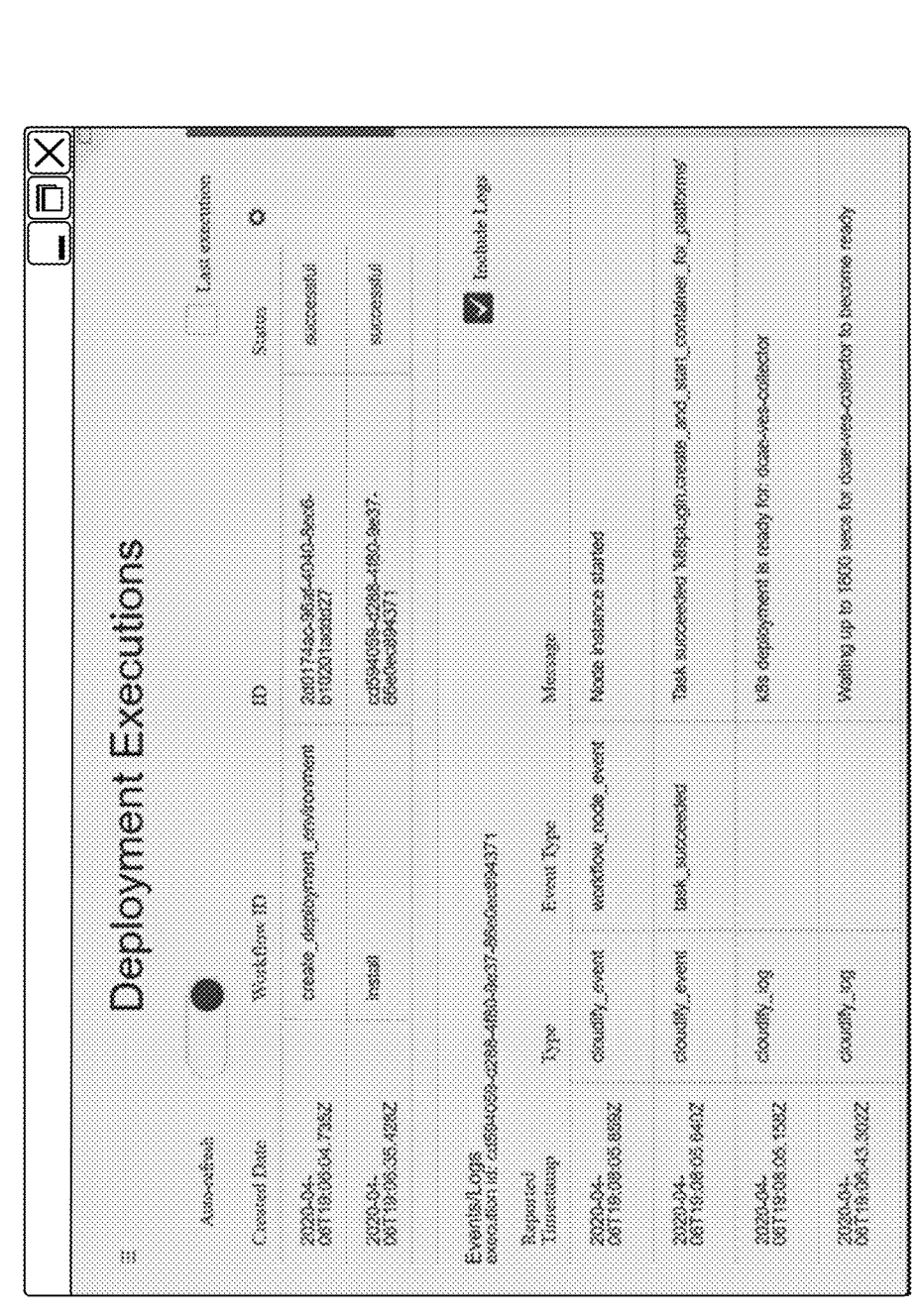

FIGS. 5U and 5V show illustrative screen displays 500U and 500V. As shown in FIG. 5U, the screen display 500U can be used to update a user or other entity on the status of deployment of a blueprint from the dashboard, with various options being provided to deploy the blueprint. As shown in FIG. 5V, the screen display 500V can be used to update a user or other entity on the status of the deployment and execution of a blueprint from the dashboard. Because the screen displays 500U and 500V illustrated in FIGS. 5U and 5V can include additional and/or alternative elements, it should be understood that the illustrated example embodiment is illustrative and therefore should not be construed as being limiting in any way.

It can be appreciated that the data collection analytics and events microservice onboarding and design module 132 can interface with the service creation and deployment orchestrator 106 illustrated and described herein, and therefore a user or other entity interacting with the service creation and deployment orchestrator 106 can be enabled in some embodiments to access the data collection analytics and events microservice onboarding and design module 132 via a user interface including, but not limited to, those illustrated in FIGS. 5A-5V. It should be understood that this example embodiment is illustrative, and therefore should not be construed as being limiting in any way.

Figure 6:
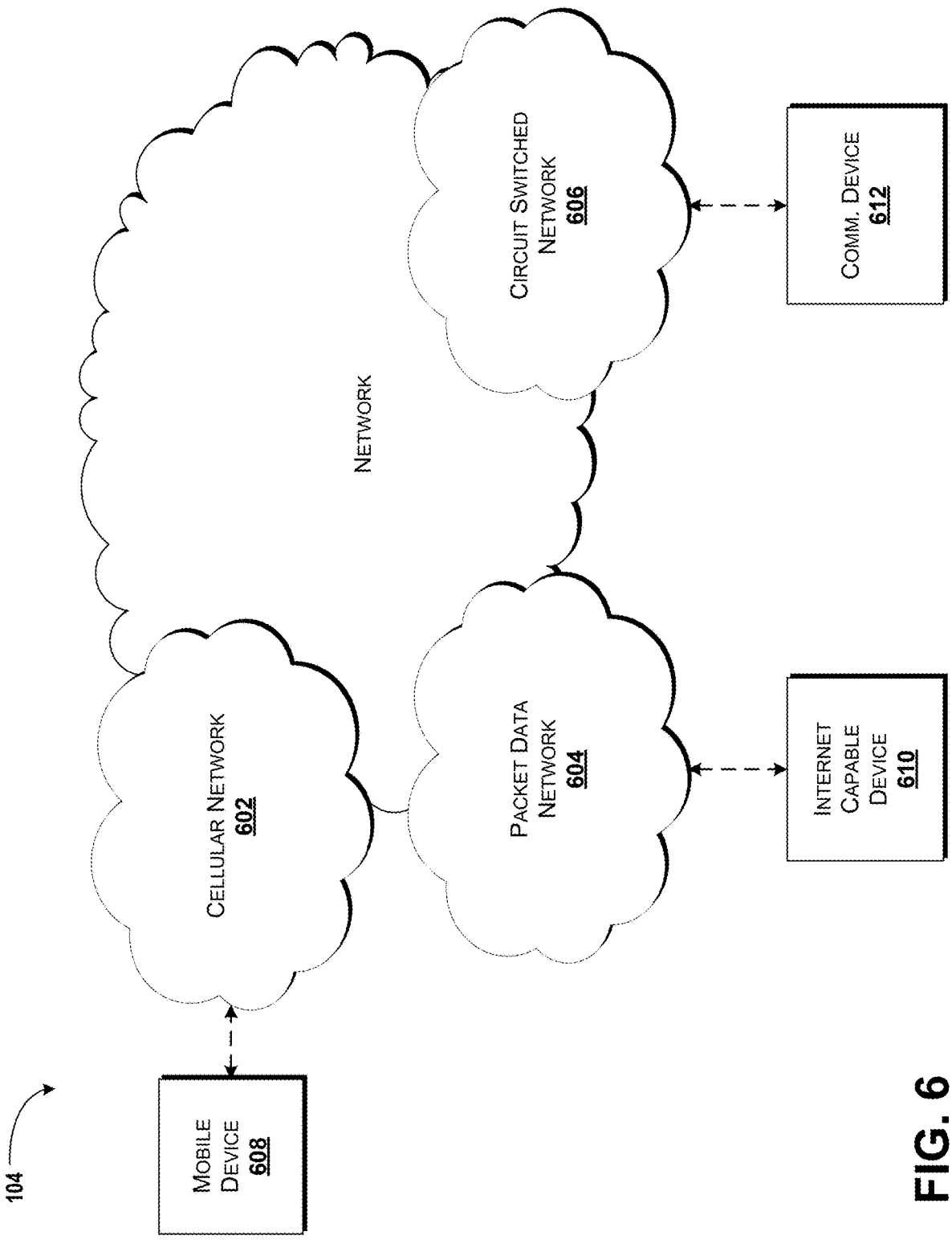
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs"); mobile management entities ("MMEs"); access and mobility management functions ("AMFs"); authentication server functions ("AUSFs"), network slice selection functions ("NSSFs"); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 602 also can include various interfaces between various components, as is generally understood. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile communication standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
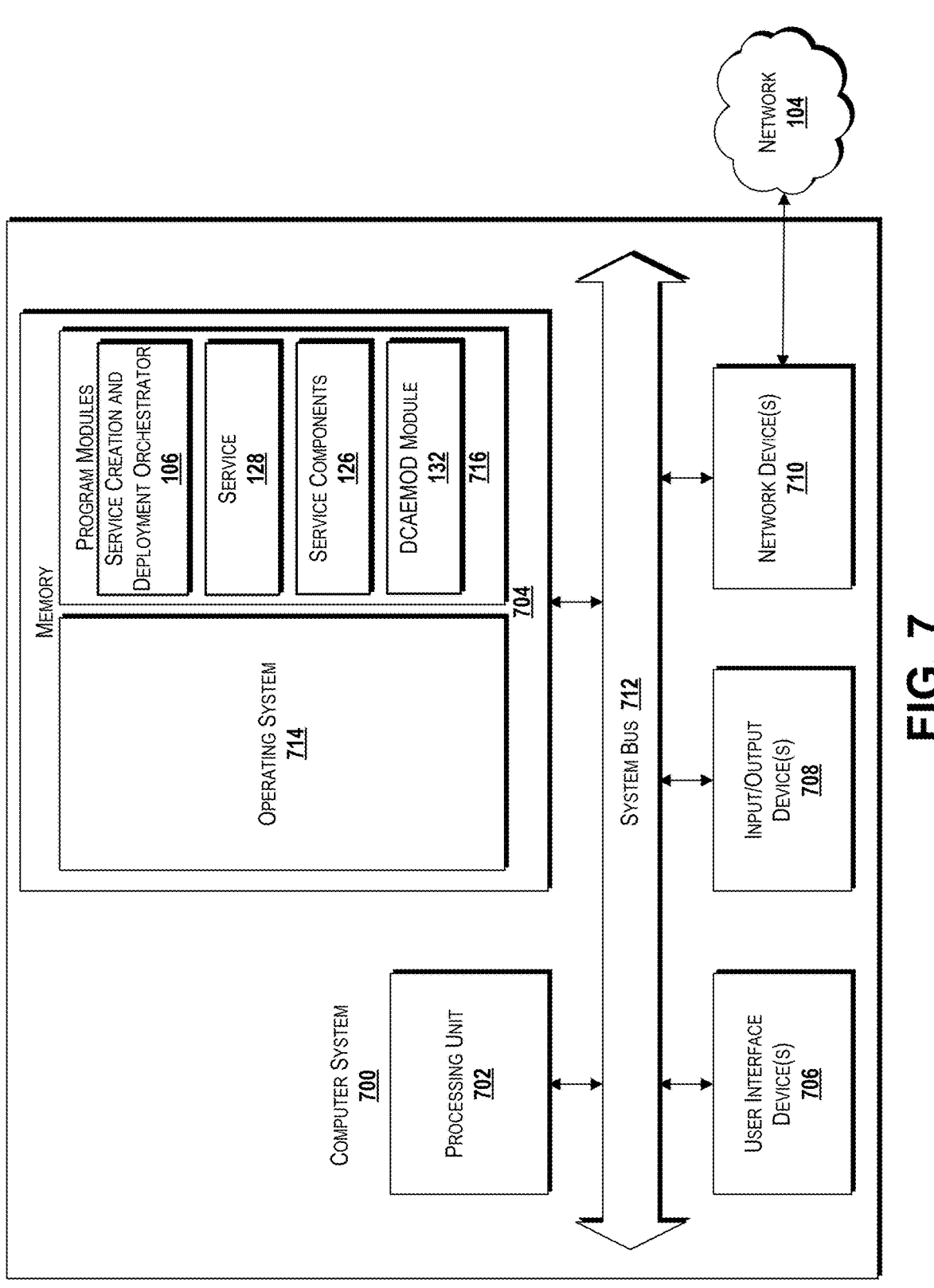
FIG. 7 is a block diagram illustrating an example computer system configured to creation and deployment service, according to some illustrative embodiments of the concepts and technologies described herein.

FIG. 7 is a block diagram illustrating a computer system 700 configured to provide the functionality described herein for a creation and deployment service such as the service creation and deployment orchestrator 106, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 can enable bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the service creation and deployment orchestrator 106 (including, for example, one or more of the cloud management module 108, the container orchestrator 110, the configuration manager 112, the infrastructure catalog 114, the security and compliance module 116, the cloud broker 118, the monitoring module 120, and the automation engine 122), the service components 126, the service 128, and/or the data collection analytics and events microservice onboarding and design module 132. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the service components 126, the service 128, the runtime data 130, the catalog data 134, the service catalog 138, the reports 148, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
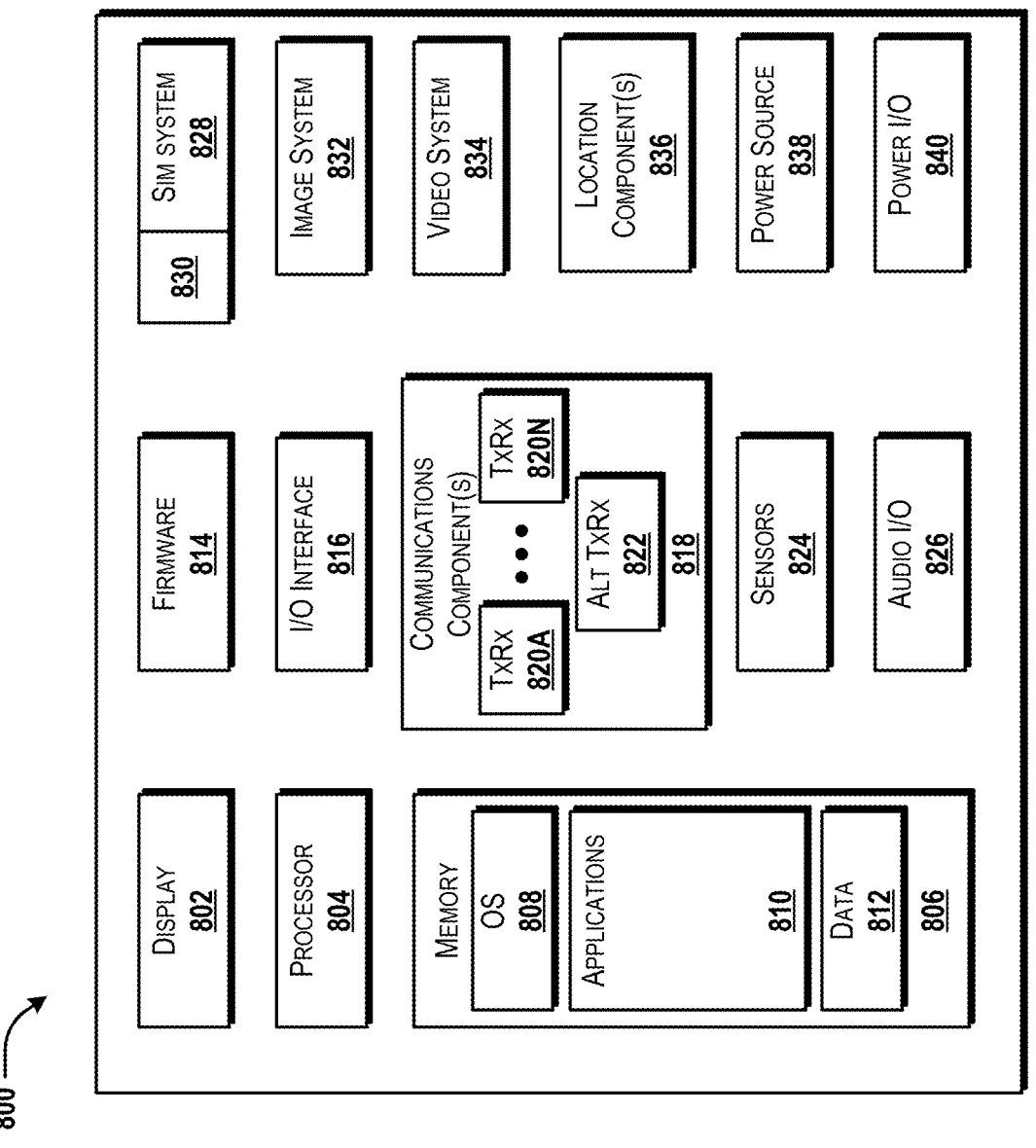
FIG. 8 is a block diagram illustrating an example mobile device configured to interact with a creation and deployment service, according to some illustrative embodiments of the concepts and technologies described herein.

Turning now to FIG. 8, an illustrative mobile device 800 and components thereof will be described. In some embodiments, the user device 142 described above with reference to FIG. 1A can be configured as and/or can have an architecture similar or identical to the mobile device 800 described herein in FIG. 8. It should be understood, however, that the user device 142 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, 6G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
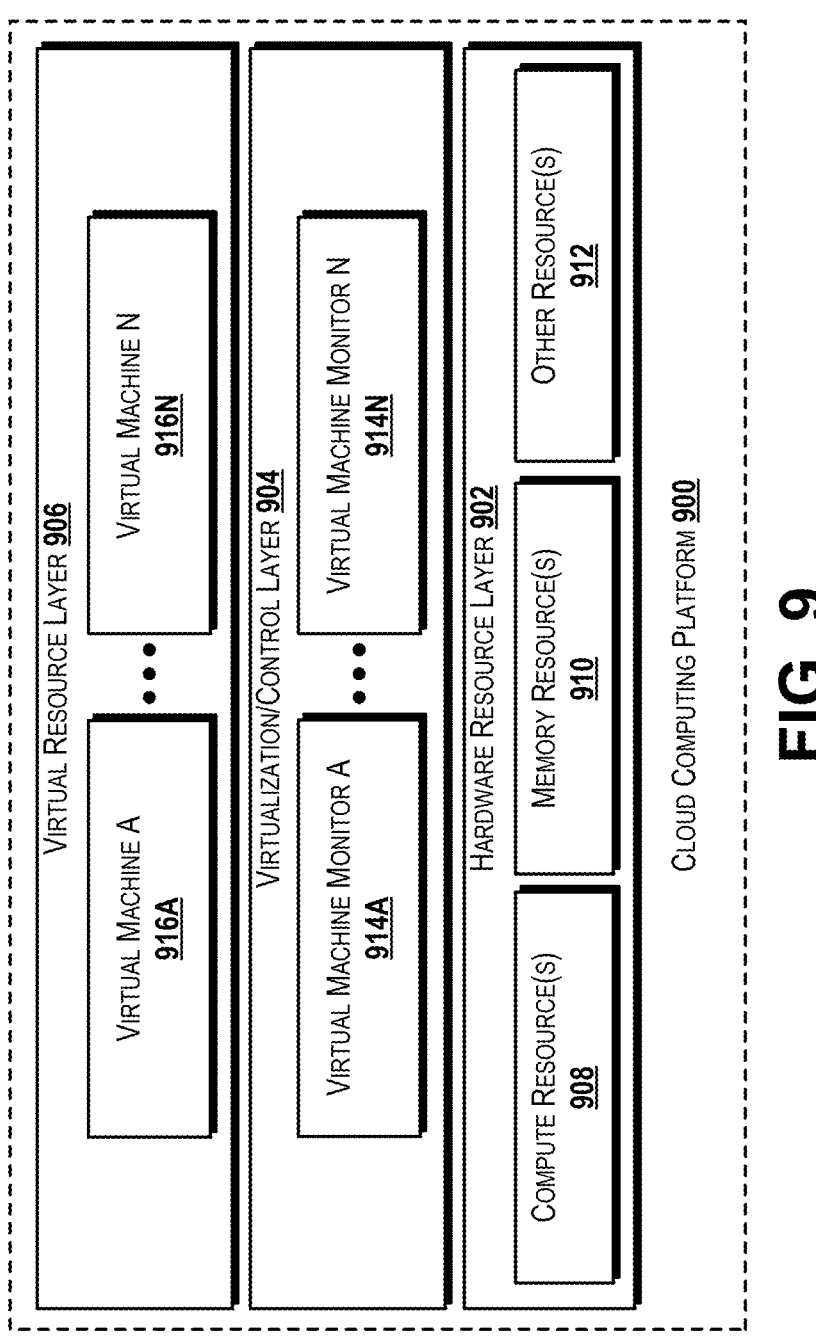
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for creation and deployment of a service 128 using a service creation and deployment orchestrator 106 and/or for interacting with the service creation and deployment orchestrator 106 (including, for example, one or more of the cloud management module 108, the container orchestrator 110, the configuration manager 112, the infrastructure catalog 114, the security and compliance module 116, the cloud broker 118, the monitoring module 120, and the automation engine 122), the service components 126, the service 128, and/or the data collection analytics and events microservice onboarding and design module 132. Thus, it can be appreciated that in some embodiments of the concepts and technologies disclosed herein, the cloud computing platform 900 illustrated in FIG. 9 can be used to provide the functionality described herein with respect to the server computer 102, the computing environments 124, and/or the data collection analytics and events microservice onboarding and design module 132.

The cloud computing platform 900 thus may be utilized to execute any aspects of the software components presented herein. Thus, according to various embodiments of the concepts and technologies disclosed herein, the service creation and deployment orchestrator 106 (including, for example, one or more of the cloud management module 108, the container orchestrator 110, the configuration manager 112, the infrastructure catalog 114, the security and compliance module 116, the cloud broker 118, the monitoring module 120, and the automation engine 122), the service components 126, the service 128, and/or the data collection analytics and events microservice onboarding and design module 132 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the service creation and deployment orchestrator 106 (including, for example, one or more of the cloud management module 108, the container orchestrator 110, the configuration manager 112, the infrastructure catalog 114, the security and compliance module 116, the cloud broker 118, the monitoring module 120, and the automation engine 122), the service components 126, the service 128, and/or the data collection analytics and events microservice onboarding and design module 132 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAP-DRAGON brand family of SoCs, available from QUAL-COMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLD-INGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the service creation and deployment orchestrator 106 (including, for example, one or more of the cloud management module 108, the container orchestrator 110, the configuration manager 112, the infrastructure catalog 114, the security and compliance module 116, the cloud broker 118, the monitoring module 120, and the automation engine 122), the service components 126, the service 128, and/or the data collection analytics and events microservice onboarding and design module 132 or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the service components 126, the service 128, the runtime data 130, the catalog data 134, the service catalog 138, the reports 148, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for creation and deployment of services have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising receiving a service request comprising a request for a service, wherein the service request identifies intended functionality of the service, accessing a service catalog that defines service components comprising microservices, the service catalog comprising metadata that defines purposes of the service components, recommending, based on the intended functionality of the service and the metadata that defines the purposes of the service components, a service design for the service, the service design including a first service component and a second service component, configuring each of the first service component and the second service component, wherein configuring comprises defining outputs and inputs for the first service component and the second service component, identifying, for each of the first service component and the second service component, infrastructure that is to support the first service component and the second service component and a geographic location of the infrastructure, configuring, for each of the first service component and the second service component, security policies including one of a firewall, a filter list, or an authentication requirement, preparing the first service component and the second service component for deployment to the infrastructure, and triggering deployment of the first service component and the second service component to the infrastructure to deploy the service, wherein the first service component is deployed to a first computing environment and the second service component is deployed to a second computing environment.

2. The system of claim 1, wherein the computer-executable instructions, when executed by the processor, cause the processor to perform operations further comprising:

monitoring the service;

determining, based on monitoring the service, if any faults are detected in the service; and in response to determining that a fault is detected in the service, accessing a fault resolution policy from the service catalog and remediating the fault.

3. The system of claim 2, wherein monitoring the service comprises receiving a report from the first computing environment or the second computing environment, and wherein the report describes operation of the service.

4. The system of claim 1, wherein the computer-executable instructions, when executed by the processor, cause the processor to perform operations further comprising:

monitoring the service;

determining, based on a performance metric and a policy, if an update to the service is to be made; and in response to determining that the update to the service is to be made, updating a service component and triggering deployment of an updated service component.

5. The system of claim 4, wherein monitoring the service comprises receiving a report from the first computing environment or the second computing environment, and wherein the report comprises the performance metric.

6. The system of claim 1, wherein triggering deployment of the first service component and the second service component to the infrastructure to deploy the service comprises deploying the first service component to a first cloud provider and deploying the second service component to a second cloud provider.

7. The system of claim 1, wherein the computer-executable instructions, when executed by the processor, cause the processor to perform operations further comprising:

receiving, at a data collection analytics and events microservice onboarding and design module, runtime data from the first computing environment and the second computing environment;

generating, based on the runtime data, catalog data comprising component data, the metadata, and policies associated with the first computing environment and the second computing environment; and storing the catalog data as the service catalog.

8. A method comprising:

receiving, at a computer comprising a processor, a service request comprising a request for a service, wherein the service request identifies intended functionality of the service;

accessing, by the processor, a service catalog that defines service components comprising microservices, the service catalog comprising metadata that defines purposes of the service components;

recommending, by the processor and based on the intended functionality of the service and the metadata that defines the purposes of the service components, a service design for the service, the service design including a first service component and a second service component;

configuring, by the processor, each of the first service component and the second service component, wherein configuring comprises defining outputs and inputs for the first service component and the second service component;

identifying, by the processor and for each of the first service component and the second service component, infrastructure that is to support the first service component and the second service component and a geographic location of the infrastructure;

configuring, by the processor and for each of the first service component and the second service component, security policies including one of a firewall, a filter list, or an authentication requirement;

preparing, by the processor, the first service component and the second service component for deployment to the infrastructure; and triggering, by the processor, deployment of the first service component and the second service component to the infrastructure, wherein the first service component is deployed to a first computing environment and the second service component is deployed to a second computing environment.

9. The method of claim 8, further comprising:

monitoring the service;

determining, based on monitoring the service, if any faults are detected in the service; and in response to determining that a fault is detected in the service, accessing a fault resolution policy from the service catalog and remediating the fault.

10. The method of claim 9, wherein monitoring the service comprises receiving a report from the first computing environment or the second computing environment, and wherein the report describes operation of the service.

11. The method of claim 8, further comprising:

monitoring the service;

determining, based on a performance metric and a policy, if an update to the service is to be made; and in response to determining that the update to the service is to be made, updating a service component and triggering deployment of an updated service component.

12. The method of claim 11, wherein monitoring the service comprises receiving a report from the first computing environment or the second computing environment, and wherein the report comprises the performance metric.

13. The method of claim 8, further comprising:

receiving, at a data collection analytics and events microservice onboarding and design module, runtime data from the first computing environment and the second computing environment;

generating, based on the runtime data, catalog data comprising component data, the metadata, and policies associated with the first computing environment and the second computing environment; and storing the catalog data as the service catalog.

14. A computer storage medium having computer-executable instructions stored thereon that, when executed by a processor, cause the processor to perform operations comprising:

receiving a service request comprising a request for a service, wherein the service request identifies intended functionality of the service;

accessing a service catalog that defines service components comprising microservices, the service catalog comprising metadata that defines purposes of the service components;

recommending, based on the intended functionality of the service and the metadata that defines the purposes of the service components, a service design for the service, the service design including a first service component and a second service component;

configuring each of the first service component and the second service component, wherein configuring comprises defining outputs and inputs for the first service component and the second service component;

identifying, by the processor and for each of the first service component and the second service component, infrastructure that is to support the first service component and the second service component and a geographic location of the infrastructure;

configuring, by the processor and for each of the first service component and the second service component, security policies including one of a firewall, a filter list, or an authentication requirement;

preparing, by the processor, the first service component and the second service component for deployment to the infrastructure; and triggering, by the processor, deployment of the first service component and the second service component to the infrastructure, wherein the first service component is deployed to a first computing environment and the second service component is deployed to a second computing environment.

15. The computer storage medium of claim 14, wherein the computer-executable instructions, when executed by the processor, cause the processor to perform operations further comprising:

monitoring the service;

determining, based on monitoring the service, if any faults are detected in the service; and in response to determining that a fault is detected in the service, accessing a fault resolution policy from the service catalog and remediating the fault.

16. The computer storage medium of claim 15, wherein monitoring the service comprises receiving a report from the first computing environment or the second computing environment, and wherein the report describes operation of the service.

17. The computer storage medium of claim 14, wherein the computer-executable instructions, when executed by the processor, cause the processor to perform operations further comprising:

monitoring the service;

determining, based on a performance metric and a policy, if an update to the service is to be made; and in response to determining that the update to the service is to be made, updating a service component and triggering deployment of an updated service component.

18. The computer storage medium of claim 17, wherein monitoring the service comprises receiving a report from the first computing environment or the second computing environment, and wherein the report comprises the performance metric.

19. The computer storage medium of claim 14, wherein triggering deployment of the first service component and the second service component to the infrastructure to deploy the service comprises deploying the first service component to a first cloud provider and deploying the second service component to a second cloud provider.

20. The computer storage medium of claim 14, wherein the computer-executable instructions, when executed by the processor, cause the processor to perform operations further comprising:

receiving, at a data collection analytics and events microservice onboarding and design module, runtime data from the first computing environment and the second computing environment;

generating, based on the runtime data, catalog data comprising component data, the metadata, and policies associated with the first computing environment and the second computing environment; and storing the catalog data as the service catalog.

* * * * *